US012021695B2

(12) United States Patent
Ding et al.

(10) Patent No.: US 12,021,695 B2
(45) Date of Patent: Jun. 25, 2024

(54) COMMUNICATION METHOD, APPARATUS, AND SYSTEM

(71) Applicant: Huawei Technologies Co., Ltd., Shenzhen (CN)

(72) Inventors: Hui Ding, Xi'an (CN); Changqi Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/902,623

(22) Filed: Sep. 2, 2022

(65) Prior Publication Data

US 2022/0417101 A1 Dec. 29, 2022

Related U.S. Application Data

(63) Continuation of application No. PCT/CN2020/120680, filed on Oct. 13, 2020.

(30) Foreign Application Priority Data

Mar. 4, 2020 (CN) .......................... 202010143072.7
Aug. 7, 2020 (CN) .......................... 202010789827.0

(51) Int. Cl.
*G06F 15/173* (2006.01)
*H04L 41/0893* (2022.01)
(Continued)

(52) U.S. Cl.
CPC ...... *H04L 41/0893* (2013.01); *H04L 41/0894* (2022.05); *H04L 43/0876* (2013.01); *H04W 28/0925* (2020.05)

(58) Field of Classification Search
CPC ........... H04W 28/0925; H04L 41/0894; H04L 43/0876
See application file for complete search history.

(56) References Cited

U.S. PATENT DOCUMENTS 7,433,943 B1 * 10/2008 Ford ..................... H04L 47/808
709/224
2013/0176908 A1 7/2013 Baniel et al.
(Continued)

FOREIGN PATENT DOCUMENTS

CN 108307474 A 7/2018
CN 109842910 A 6/2019
(Continued)

OTHER PUBLICATIONS

"[TP for SON BL CR for TS 38.423] Discussion and updates of slice load, beam load and TNL load reporting," 3GPP TSG-RAN WG3 Meeting #106, R3-196840, Reno (NV), USA, Total 12 pages, 3rd Generation Partnership Project, Valbonne, France (Nov. 18-22, 2019).

(Continued)

*Primary Examiner* — Joseph R Maniwang
(74) *Attorney, Agent, or Firm* — Leydig, Voit & Mayer, Ltd.

(57) ABSTRACT

A communication method is provided, a first policy control network element sends a subscription message to a usage monitoring network element, where the subscription message includes identification information of a first slice and identification information of a terminal device, and the subscription message is for subscribing to usage status information of the terminal device in the first slice. The first policy control network element receives, from the usage monitoring network element, first indication information indicating that usage of the terminal device in the first slice is exhausted. The first policy control network element sends, to a mobility management network element, availability status information of the first slice indicating that the first slice is unavailable; or the first policy control network element sends a user route selection policy to the terminal (Continued)

device, where the user route selection policy does not include the identification information of the first slice.

21 Claims, 12 Drawing Sheets

(51) Int. Cl.
*H04L 41/0894* (2022.01)
*H04L 43/0876* (2022.01)
*H04W 28/08* (2023.01)

(56) References Cited

U.S. PATENT DOCUMENTS

2016/0156529 A1 6/2016 Navas Cornejo et al.
2020/0396678 A1* 12/2020 Lee .................. H04W 60/04
2023/0080830 A1* 3/2023 Fernandez Alonso .. H04W 4/50

FOREIGN PATENT DOCUMENTS

| CN | 110622573 A | 12/2019 |
| WO | 2018076974 A1 | 5/2018 |
| WO | 2019196796 A1 | 10/2019 |

OTHER PUBLICATIONS

"3 Generation Partnership Project; Technical Specification Group Core Network and Terminals; 5G System; Session Management Policy Control Service; Stage 3 (Release 16)," 3GPP TS 29.512; V16.3.0 23, XP051840974, Total 178 pages, 3rd Generation Partnership Project, Valbonne, France (Dec. 23, 2019).

* cited by examiner

COMMUNICATION METHOD, APPARATUS, AND SYSTEM

CROSS-REFERENCE TO RELATED APPLICATIONS

This application is a continuation of International Application No. PCT/CN2020/120680, filed on Oct. 13, 2020, which claims priority to Chinese Patent Application No. 202010143072.7, filed on Mar. 4, 2020 and Chinese Patent Application No. 202010789827.0, filed on Aug. 7, 2020. All of the aforementioned patent applications are hereby incorporated by reference in their entireties.

TECHNICAL FIELD

This application relates to the field of communication technologies, and in particular, to a communication method, an apparatus, and a system.

BACKGROUND

In a conventional technology, when a terminal device uses a slice, there may be a quota limit. For example, a quota of the terminal may be limited to be equal to a quota of the slice or the quota of the slice multiplied by a percentage.

When usage of the terminal device reaches the quota, an error may occur if the terminal device still continues to use the slice.

SUMMARY

This application provides a communication method, an apparatus, and a system, so that a slice is correctly configured for a terminal device, to implement normal communication.

According to a first aspect, this application provides a communication method. The method includes: A first policy control network element sends a subscription message to a usage monitoring network element, where the subscription message includes identification information of a first slice and identification information of a terminal device, and the subscription message is for subscribing to usage status information of the terminal device in the first slice. The first policy control network element receives first indication information from the usage monitoring network element, where the first indication information indicates that usage of the terminal device in the first slice is exhausted. The first policy control network element sends availability status information of the first slice to a mobility management network element, where the availability status information indicates that the first slice is unavailable; or the first policy control network element sends a user route selection policy to the terminal device, where the user route selection policy does not include the identification information of the first slice.

Based on the foregoing solution, after the usage of the terminal device in the first slice is exhausted, the terminal device can be prevented from continuing to use a service of the first slice. This helps implement correct communication.

In a possible implementation method, before the first policy control network element sends the subscription message to the usage monitoring network element, the first policy control network element receives, from the mobility management network element, identification information of a slice that the terminal device is allowed to access, where the slice that the terminal device is allowed to access includes the first slice.

In a possible implementation method, the first policy control network element determines the first slice in the slice that the terminal device is allowed to access.

Based on this solution, the first policy control network element determines the first slice in which usage monitoring needs to be performed, so that overheads of the mobility management network element can be reduced.

In a possible implementation method, before the first policy control network element sends the subscription message to the usage monitoring network element, the first policy control network element receives the identification information of the first slice and second indication information from the mobility management network element, where the second indication information indicates to monitor a usage status of the terminal device in the first slice.

Based on this solution, the mobility management network element determines the first slice in which usage monitoring needs to be performed, so that overheads of the first policy control network element can be reduced.

According to a second aspect, this application provides a communication method. The method includes: A first policy control network element sends a subscription message to a usage monitoring network element, where the subscription message includes identification information of a first slice, and the subscription message is for subscribing to usage status information of the first slice. The first policy control network element receives first indication information from the usage monitoring network element, where the first indication information indicates that usage of the first slice is exhausted. The first policy control network element sends availability status information of the first slice to a mobility management network element, where the availability status information indicates that the first slice is unavailable; or the first policy control network element sends a user route selection policy to a terminal device allowed to access the first slice, where the user route selection policy does not include the identification information of the first slice.

Based on the foregoing solution, after the usage of the first slice is exhausted, the terminal device allowed to access the first slice can be prevented from continuing to use a service of the first slice. This helps implement correct communication.

In a possible implementation method, before the first policy control network element sends the subscription message to the usage monitoring network element, the first policy control network element receives the identification information of the first slice and second indication information from the mobility management network element, where the second indication information indicates to monitor a usage status of the first slice.

Based on this solution, the mobility management network element determines the first slice in which usage monitoring needs to be performed, so that overheads of the first policy control network element can be reduced.

Based on any one of the first aspect, the second aspect, the possible implementation methods of the first aspect, or the possible implementation methods of the second aspect:

In a possible implementation method, that the first policy control network element receives first indication information from the usage monitoring network element specifically includes: The first policy control network element receives a slice usage status event report from the usage monitoring network element, where the slice usage status event report includes the identification information of the first slice and the first indication information.

In a possible implementation method, the usage monitoring network element is a second policy control network element, and the second policy control network element serves a session management network element; the usage monitoring network element is a unified data repository; or the usage monitoring network element is a network data analysis network element.

According to a third aspect, this application provides a communication method. The method includes: A mobility management network element receives availability status information of a first slice from a policy control network element, where the availability status information indicates that the first slice is unavailable, and the availability status information is sent when usage of a terminal device in the first slice is exhausted. The mobility management network element sends, to the terminal device, identification information of a slice that the terminal device is allowed to access, where the identification information of the slice that the terminal device is allowed to access does not include identification information of the first slice.

Based on the foregoing solution, after the usage of the terminal device in the first slice is exhausted, the terminal device can be prevented from continuing to use a service of the first slice. This helps implement correct communication.

In a possible implementation method, before the mobility management network element receives the availability status information of the first slice from the policy control network element, the mobility management network element sends, to the policy control network element, the identification information of the slice that the terminal device is allowed to access, where the slice that the terminal device is allowed to access includes the first slice; or the mobility management network element determines the first slice in the slice that the terminal device is allowed to access, and sending the identification information of the first slice and indication information to the policy control network element, where the indication information indicates to monitor a usage status of the terminal device in the first slice.

According to a fourth aspect, this application provides a communication method. The method includes: A mobility management network element receives availability status information of a first slice from a policy control network element, where the availability status information indicates that the first slice is unavailable, and the availability status information is sent when usage of the first slice is exhausted. The mobility management network element sends, to a terminal device allowed to access the first slice, updated identification information of a slice that the terminal device is allowed to access, where the updated identification information of the slice that the terminal device is allowed to access does not include identification information of the first slice.

Based on the foregoing solution, after the usage of the first slice is exhausted, the terminal device allowed to access the first slice can be prevented from continuing to use a service of the first slice. This helps implement correct communication.

In a possible implementation method, before the mobility management network element receives the availability status information of the first slice from the policy control network element, the mobility management network element determines the first slice in a slice supported by the mobility management network element; and the mobility management network element sends the identification information of the first slice and indication information to the policy control network element, where the indication information indicates to monitor a usage status of the first slice.

According to a fifth aspect, this application provides a communication method. The method includes: A first policy control network element sends a subscription message to a usage monitoring network element, where the subscription message includes identification information of a first network and identification information of a terminal device, and the subscription message is for subscribing to usage status information of the terminal device in the first network. The first policy control network element receives first indication information from the usage monitoring network element, where the first indication information indicates that usage of the terminal device in the first network is exhausted. The first policy control network element sends availability status information of the first network to a mobility management network element, where the availability status information indicates that the first network is unavailable; or the first policy control network element sends a user route selection policy to the terminal device, where the user route selection policy does not include the identification information of the first network.

Based on the foregoing solution, after the usage of the terminal device in the first network is exhausted, the terminal device can be prevented from continuing to use a service of the first network. This helps implement correct communication.

In a possible implementation method, the identification information of the first network is a first data network name (DNN), the first DNN identifies a first data network, the subscription message is for subscribing to usage status information of the terminal device in the first data network, and the first indication information indicates that usage of the terminal device in the first data network is exhausted.

In a possible implementation method, before the first policy control network element sends the subscription message to the usage monitoring network element, the method further includes: The first policy control network element receives a subscribed DNN from the mobility management network element, where the subscribed DNN includes the first DNN.

In a possible implementation method, the first policy control network element determines the first DNN in the subscribed DNN.

In a possible implementation method, before the first policy control network element sends the subscription message to the usage monitoring network element, the method further includes: The first policy control network element receives the first DNN and second indication information from the mobility management network element, where the second indication information indicates to monitor a usage status of the terminal device in the first data network.

In a possible implementation method, that the first policy control network element receives first indication information from the usage monitoring network element includes: The first policy control network element receives a usage status event report from the usage monitoring network element, where the usage status event report includes the first DNN and the first indication information.

In a possible implementation method, the identification information of the first network is a first data network name (DNN) and identification information of a first slice, the first DNN identifies a first data network, the identification information of the first slice identifies the first slice, the subscription message is for subscribing to usage status information of the terminal device in the first data network and usage status information of the terminal device in the first slice, and the first indication information indicates that usage of the terminal device in the first data network and usage of the terminal device in the first slice are exhausted.

In a possible implementation method, before the first policy control network element sends the subscription message to the usage monitoring network element, the method further includes: The first policy control network element receives, from the mobility management network element, a subscribed DNN and identification information of a slice that the terminal device is allowed to access, where the subscribed DNN includes the first DNN, and the slice that the terminal device is allowed to access includes the first slice.

In a possible implementation method, the first policy control network element determines the first DNN in the subscribed DNN and the first slice in the slice that the terminal device is allowed to access.

In a possible implementation method, before the first policy control network element sends the subscription message to the usage monitoring network element, the method further includes: The first policy control network element receives the first DNN, the identification information of the first slice, and second indication information from the mobility management network element, where the second indication information indicates to monitor a usage status of the terminal device in the first data network and a usage status of the terminal device in the first slice.

In a possible implementation method, that the first policy control network element receives first indication information from the usage monitoring network element includes: The first policy control network element receives a usage status event report from the usage monitoring network element, where the usage status event report includes the first DNN, the identification information of the first slice, and the first indication information.

According to a sixth aspect, an embodiment of this application provides a communication method, including: A mobility management network element receives availability status information of a first network from a policy control network element, where the availability status information indicates that the first network is unavailable, and the availability status information is sent when usage of a terminal device in the first network is exhausted. The mobility management network element sends an identifier of a second network to the terminal device, where the second network is a network that the terminal device is allowed to access, and the identifier of the second network does not include identification information of the first network.

Based on the foregoing solution, after the usage of the terminal device in the first network is exhausted, the terminal device can be prevented from continuing to use a service of the first network. This helps implement correct communication.

In a possible implementation method, the identification information of the first network is a first data network name (DNN), and the first DNN identifies a first data network. Before the mobility management network element receives the availability status information of the first network from the policy control network element, the method further includes: The mobility management network element sends a subscribed DNN to the policy control network element, where the subscribed DNN includes the first DNN; or the mobility management network element determines the first DNN in a subscribed DNN, and sends the first DNN and indication information to the policy control network element, where the indication information indicates to monitor a usage status of the terminal device in the first data network.

In a possible implementation method, the identification information of the first network is a first data network name DNN and identification information of a first slice, and the first DNN identifies a first data network. Before the mobility management network element receives the availability status information of the first network from the policy control network element, the method further includes: The mobility management network element sends, to the policy control network element, a subscribed DNN and identification information of a slice that the terminal device is allowed to access, where the subscribed DNN includes the first DNN, and the slice that the terminal device is allowed to access includes the first slice; or the mobility management network element determines the first DNN in a subscribed DNN and the first slice in a slice that the terminal device is allowed to access, and sends the first DNN, the identification information of the first slice, and indication information to the policy control network element, where the indication information indicates to monitor a usage status of the terminal device in the first data network and a usage status of the terminal device in the first slice.

According to a seventh aspect, an embodiment of this application provides a communication method, including: A first policy control network element receives first indication information from a usage monitoring network element, where the first indication information indicates that usage of a terminal device in a first slice is exhausted. The first policy control network element sends availability status information of the first slice to a mobility management network element, where the availability status information indicates that the first slice is unavailable; or the first policy control network element sends a user route selection policy to the terminal device, where the user route selection policy does not include identification information of the first slice.

Based on the foregoing solution, after the usage of the terminal device in the first slice is exhausted, the terminal device can be prevented from continuing to use a service of the first slice. This helps implement correct communication.

In a possible implementation method, the first policy control network element sends a subscription message to the usage monitoring network element, where the subscription message includes the identification information of the first slice and identification information of the terminal device, and the subscription message is for subscribing to usage status information of the terminal device in the first slice.

According to an eighth aspect, this application provides a communication method. The method includes: A first policy control network element receives first indication information from a usage monitoring network element, where the first indication information indicates that usage of a first slice is exhausted. The first policy control network element sends availability status information of the first slice to a mobility management network element, where the availability status information indicates that the first slice is unavailable; or the first policy control network element sends a user route selection policy to a terminal device allowed to access the first slice, where the user route selection policy does not include identification information of the first slice.

Based on the foregoing solution, after the usage of the first slice is exhausted, the terminal device allowed to access the first slice can be prevented from continuing to use a service of the first slice. This helps implement correct communication.

In a possible implementation method, the first policy control network element sends a subscription message to the usage monitoring network element, where the subscription message includes the identification information of the first slice, and the subscription message is for subscribing to usage status information of the first slice.

According to a ninth aspect, this application provides a communication method. The method includes: A first policy control network element receives first indication information from a usage monitoring network element, where the first indication information indicates that usage of a terminal device in a first network is exhausted. The first policy control network element sends availability status information of the first network to a mobility management network element, where the availability status information indicates that the first network is unavailable; or the first policy control network element sends a user route selection policy to the terminal device, where the user route selection policy does not include identification information of the first network.

Based on the foregoing solution, after the usage of the terminal device in the first network is exhausted, the terminal device can be prevented from continuing to use a service of the first network. This helps implement correct communication.

In a possible implementation method, the first policy control network element sends a subscription message to the usage monitoring network element, where the subscription message includes the identification information of the first network and identification information of the terminal device, and the subscription message is for subscribing to usage status information of the terminal device in the first network.

According to a tenth aspect, this application provides a communication method. The method includes: A usage monitoring network element obtains identification information of a terminal device and identification information of a first slice. The usage monitoring network element determines that usage of the terminal device in the first slice is exhausted. The usage monitoring network element sends first indication information to a first policy control network element, where the first indication information indicates that the usage of the terminal device in the first slice is exhausted.

According to an eleventh aspect, this application provides a communication method. The method includes: A usage monitoring network element obtains identification information of a first slice. The usage monitoring network element determines that usage of the first slice is exhausted. The usage monitoring network element sends first indication information to a first policy control network element, where the first indication information indicates that the usage of the first slice is exhausted.

According to a twelfth aspect, this application provides a communication method. The method includes: A usage monitoring network element obtains identification information of a first network and identification information of a terminal device. The usage monitoring network element determines that usage of the terminal device in the first network is exhausted. The usage monitoring network element sends first indication information to a first policy control network element, where the first indication information indicates that the usage of the terminal device in the first network is exhausted.

According to a thirteenth aspect, an embodiment of this application provides a communication apparatus. The apparatus may be a policy control network element, or may be a chip used in the policy control network element. The apparatus has a function of implementing the first aspect, the second aspect, the fifth aspect, the seventh aspect, the eighth aspect, the ninth aspect, the implementation methods of the first aspect, the implementation methods of the second aspect, the implementation methods of the fifth aspect, the implementation methods of the seventh aspect, the implementation methods of the eighth aspect, or the implementation methods of the ninth aspect. The function may be implemented by using hardware, or may be implemented by hardware executing corresponding software. The hardware or the software includes one or more modules corresponding to the function.

According to a fourteenth aspect, an embodiment of this application provides a communication apparatus. The apparatus may be a mobility management network element, or may be a chip used in the mobility management network element. The apparatus has a function of implementing the third aspect, the fourth aspect, the sixth aspect, the implementation methods of the third aspect, the implementation methods of the fourth aspect, or the implementation methods of the sixth aspect. The function may be implemented by using hardware, or may be implemented by hardware executing corresponding software. The hardware or the software includes one or more modules corresponding to the function.

According to a fifteenth aspect, an embodiment of this application provides a communication apparatus. The apparatus may be a usage monitoring network element, or may be a chip used in the usage monitoring network element. The apparatus has a function of implementing the tenth aspect, the eleventh aspect, the twelfth aspect, the implementation methods of the tenth aspect, the implementation methods of the eleventh aspect, or the implementation methods of the twelfth aspect. The function may be implemented by using hardware, or may be implemented by hardware executing corresponding software. The hardware or the software includes one or more modules corresponding to the function.

According to a sixteenth aspect, an embodiment of this application provides a communication apparatus, including a processor and a memory. The memory is configured to store computer-executable instructions. When the apparatus runs, the processor executes the computer-executable instructions stored in the memory, so that the apparatus performs the methods in the first aspect to the twelfth aspect, or the implementation methods of the first aspect to the twelfth aspect.

According to a seventeenth aspect, an embodiment of this application provides a communication apparatus, including units or means configured to perform the steps of the methods in the first aspect to the twelfth aspect or the implementation methods of the first aspect to the twelfth aspect.

According to an eighteenth aspect, an embodiment of this application provides a communication apparatus, including a processor and a communication interface. The communication interface is configured to receive code instructions and transmit the code instructions to the processor. The processor is configured to run the code instructions to perform the methods in the first aspect to the twelfth aspect or the implementation methods of the first aspect to the twelfth aspect.

According to a nineteenth aspect, an embodiment of this application provides a communication apparatus, including a processor, coupled to a memory, and configured to invoke a program stored in the memory, to perform the methods in the first aspect to the twelfth aspect or the implementation methods of the first aspect to the twelfth aspect. The memory may be located inside or outside the apparatus. In addition, there are one or more processors.

According to a twentieth aspect, an embodiment of this application further provides a computer-readable storage medium. The computer-readable storage medium stores instructions. When the instructions are run on a computer, a processor is enabled to perform the methods in the first aspect to the twelfth aspect or the implementation methods of the first aspect to the twelfth aspect.

According to a twenty-first aspect, an embodiment of this application further provides a computer program product. The computer program product includes a computer program. When the computer program is run, the methods in the first aspect to the twelfth aspect or the implementation methods of the first aspect to the twelfth aspect are enabled to be performed.

According to a twenty-second aspect, an embodiment of this application further provides a chip system, including a processor and a memory. The memory is configured to store a computer program. The processor is configured to invoke the computer program from the memory and run the computer program, so that a device in which the chip system is installed performs the methods in the first aspect to the twelfth aspect or the implementation methods of the first aspect to the twelfth aspect.

According to a twenty-third aspect, an embodiment of this application further provides a communication system, including a first policy control network element and a usage monitoring network element. The first policy control network element is configured to: send a subscription message to the usage monitoring network element, where the subscription message includes identification information of a first slice and identification information of a terminal device, and the subscription message is for subscribing to usage status information of the terminal device in the first slice; receive first indication information from the usage monitoring network element, where the first indication information indicates that usage of the terminal device in the first slice is exhausted; and send availability status information of the first slice to a mobility management network element, where the availability status information indicates that the first slice is unavailable; or send a user route selection policy to the terminal device, where the user route selection policy does not include the identification information of the first slice. The usage monitoring network element is configured to receive the subscription message from the first policy control network element; and send the first indication information to the first policy control network element when the usage of the terminal device in the first slice is exhausted.

According to a twenty-fourth aspect, an embodiment of this application further provides a communication method, including: A first policy control network element sends a subscription message to a usage monitoring network element, where the subscription message includes identification information of a first slice and identification information of a terminal device, and the subscription message is for subscribing to usage status information of the terminal device in the first slice. The usage monitoring network element receives the subscription message from the first policy control network element. The usage monitoring network element sends first indication information to the first policy control network element when usage of the terminal device in the first slice is exhausted, where the first indication information indicates that the usage of the terminal device in the first slice is exhausted. The first policy control network element receives the first indication information from the usage monitoring network element. The first policy control network element sends availability status information of the first slice to a mobility management network element, where the availability status information indicates that the first slice is unavailable; or the first policy control network element sends a user route selection policy to the terminal device, where the user route selection policy does not include the identification information of the first slice.

According to a twenty-fifth aspect, an embodiment of this application further provides a communication system, including a first policy control network element and a usage monitoring network element. The first policy control network element is configured to: send a subscription message to the usage monitoring network element, where the subscription message includes identification information of a first slice, and the subscription message is for subscribing to usage status information of the first slice; receive first indication information from the usage monitoring network element, where the first indication information indicates that usage of the first slice is exhausted; and send availability status information of the first slice to a mobility management network element, where the availability status information indicates that the first slice is unavailable; or send a user route selection policy to a terminal device allowed to access the first slice, where the user route selection policy does not include the identification information of the first slice. The usage monitoring network element is configured to receive the subscription message from the first policy control network element; and send the first indication information to the first policy control network element when the usage of the first slice is exhausted.

According to a twenty-sixth aspect, an embodiment of this application further provides a communication method, including: A first policy control network element sends a subscription message to a usage monitoring network element, where the subscription message includes identification information of a first slice, and the subscription message is for subscribing to usage status information of the first slice. The usage monitoring network element receives the subscription message from the first policy control network element. The usage monitoring network element sends first indication information to the first policy control network element when usage of the first slice is exhausted, where the first indication information indicates that the usage of the first slice is exhausted. The first policy control network element receives the first indication information from the usage monitoring network element. The first policy control network element sends availability status information of the first slice to a mobility management network element, where the availability status information indicates that the first slice is unavailable; or the first policy control network element sends a user route selection policy to a terminal device allowed to access the first slice, where the user route selection policy does not include the identification information of the first slice.

According to a twenty-seventh aspect, an embodiment of this application further provides a communication system, including a first policy control network element and a usage monitoring network element. The first policy control network element is configured to: send a subscription message to the usage monitoring network element, where the subscription message includes identification information of a first network and identification information of a terminal device, and the subscription message is for subscribing to usage status information of the terminal device in the first network; receive first indication information from the usage monitoring network element, where the first indication information indicates that usage of the terminal device in the first network is exhausted; and send availability status information of the first network to a mobility management network element, where the availability status information indicates that the first network is unavailable; or send a user route selection policy to the terminal device, where the user route selection policy does not include the identification information of the first network. The usage monitoring network element is configured to receive the subscription message from the first policy control network element; and send the first indication information to the first policy control network element when the usage of the terminal device in the first network is exhausted.

According to a twenty-eighth aspect, an embodiment of this application further provides a communication method, including: A first policy control network element sends a subscription message to a usage monitoring network element, where the subscription message includes identification information of a first network and identification information of a terminal device, and the subscription message is for subscribing to usage status information of the terminal device in the first network. The usage monitoring network element receives the subscription message from the first policy control network element. The usage monitoring network element sends first indication information to the first policy control network element when usage of the terminal device in the first network is exhausted, where the first indication information indicates that the usage of the terminal device in the first network is exhausted. The first policy control network element receives the first indication information from the usage monitoring network element. The first policy control network element sends availability status information of the first network to a mobility management network element, where the availability status information indicates that the first network is unavailable; or the first policy control network element sends a user route selection policy to the terminal device, where the user route selection policy does not include the identification information of the first network.

DESCRIPTION OF EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more.

Figure 1:
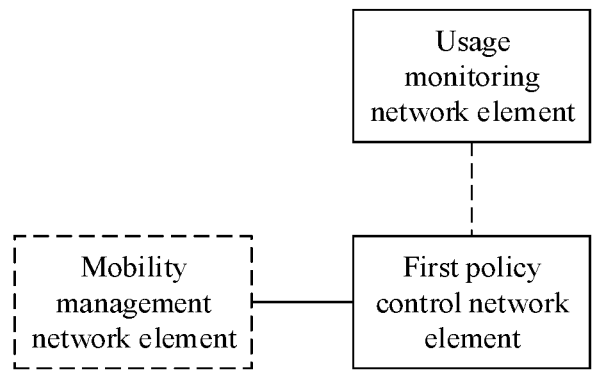
FIG. 1 is a schematic diagram of a communication system according to this application.

To resolve the problem mentioned in the background, in FIG. 1, this application provides a communication system. The system includes a first policy control network element and a usage monitoring network element. Optionally, the system further includes a mobility management network element.

The usage monitoring network element may be a second policy control network element, and the second policy control network element serves a session management network element. Alternatively, the usage monitoring network element may be a unified data repository. Alternatively, the usage monitoring network element may be a network data analysis network element.

In a First Embodiment

The first policy control network element is configured to: send a subscription message to the usage monitoring network element, where the subscription message includes identification information of a first slice and identification information of a terminal device, and the subscription message is for subscribing to usage status information of the terminal device in the first slice; receive first indication information from the usage monitoring network element, where the first indication information indicates that usage of the terminal device in the first slice is exhausted; and send availability status information of the first slice to the mobility management network element, where the availability status information indicates that the first slice is unavailable; or send a user route selection policy to the terminal device, where the user route selection policy does not include the identification information of the first slice. The usage monitoring network element is configured to receive the subscription message from the first policy control network element; and send the first indication information to the first policy control network element when the usage of the terminal device in the first slice is exhausted.

In a possible implementation method, the first policy control network element is further configured to: before sending the subscription message to the usage monitoring network element, receive, from the mobility management network element, identification information of a slice that the terminal device is allowed to access, where the slice that the terminal device is allowed to access includes the first slice.

In a possible implementation method, the first policy control network element is further configured to determine the first slice in the slice that the terminal device is allowed to access.

In a possible implementation method, the first policy control network element is further configured to: before sending the subscription message to the usage monitoring network element, receive the identification information of the first slice and second indication information from the mobility management network element, where the second indication information indicates to monitor a usage status of the terminal device in the first slice.

In a possible implementation method, that the first policy control network element is configured to receive the first indication information from the usage monitoring network element specifically includes: being configured to receive a slice usage status event report from the usage monitoring network element, where the slice usage status event report includes the identification information of the first slice and the first indication information.

In a possible implementation method, the mobility management network element is configured to send, to the terminal device, identification information of a slice that the terminal device is allowed to access, where the identification information of the slice that the terminal device is allowed to access does not include the identification information of the first slice.

In a Second Embodiment

The first policy control network element is configured to: send a subscription message to the usage monitoring network element, where the subscription message includes identification information of a first slice, and the subscription message is for subscribing to usage status information of the first slice; receive first indication information from the usage monitoring network element, where the first indication information indicates that usage of the first slice is exhausted; and send availability status information of the first slice to the mobility management network element, where the availability status information indicates that the first slice is unavailable; or send a user route selection policy to a terminal device allowed to access the first slice, where the user route selection policy does not include the identification information of the first slice. The usage monitoring network element is configured to receive the subscription message from the first policy control network element; and send the first indication information to the first policy control network element when the usage of the first slice is exhausted.

The terminal device allowed to access the first slice may alternatively be understood as a terminal device that supports access to the first slice. Specifically, it may be understood as that an identifier (Allowed NSSAI) that is received by the terminal device and that is of a slice that the terminal device is allowed to access or a subscribed slice identifier (Subscribed NSSAI) of the terminal device includes the identification information of the first slice.

In a possible implementation method, the first policy control network element is further configured to: before sending the subscription message to the usage monitoring network element, receive the identification information of the first slice and second indication information from the mobility management network element, where the second indication information indicates to monitor a usage status of the first slice.

In a possible implementation method, that the first policy control network element is configured to receive the first indication information from the usage monitoring network element specifically includes: being configured to receive a slice usage status event report from the usage monitoring network element, where the slice usage status event report includes the identification information of the first slice and the first indication information.

In a possible implementation method, the mobility management network element is configured to send, to the terminal device allowed to access the first slice, updated identification information of a slice that the terminal device is allowed to access, where the updated identification information of the slice that the terminal device is allowed to access does not include the identification information of the first slice.

In a Third Embodiment

The first policy control network element is configured to: send a subscription message to the usage monitoring network element, where the subscription message includes identification information of a first network and identification information of a terminal device, and the subscription message is for subscribing to usage status information of the terminal device in the first network; receive first indication information from the usage monitoring network element, where the first indication information indicates that usage of the terminal device in the first network is exhausted; and send availability status information of the first network to the mobility management network element, where the availability status information indicates that the first network is unavailable; or send a user route selection policy to the terminal device, where the user route selection policy does not include the identification information of the first network. The usage monitoring network element is configured to receive the subscription message from the first policy control network element; and send the first indication information to the first policy control network element when the usage of the terminal device in the first network is exhausted.

In a possible implementation method, the identification information of the first network is a first data network name (DNN), the first DNN identifies a first data network, the subscription message is for subscribing to usage status information of the terminal device in the first data network, and the first indication information indicates that usage of the terminal device in the first data network is exhausted.

In a possible implementation method, the first policy control network element is further configured to: before sending the subscription message to the usage monitoring network element, receive a subscribed DNN from the mobility management network element, where the subscribed DNN includes the first DNN.

In a possible implementation method, the first policy control network element is further configured to determine the first DNN in the subscribed DNN.

In a possible implementation method, the first policy control network element is further configured to: before sending the subscription message to the usage monitoring network element, receive the first DNN and second indication information from the mobility management network element, where the second indication information indicates to monitor a usage status of the terminal device in the first data network.

In a possible implementation method, that the first policy control network element is configured to receive the first indication information from the usage monitoring network element specifically includes: being configured to receive a usage status event report from the usage monitoring network element, where the usage status event report includes the first DNN and the first indication information.

In a possible implementation method, the identification information of the first network is a first data network name (DNN) and identification information of a first slice, the first DNN identifies a first data network, the identification information of the first slice identifies the first slice, the subscription message is for subscribing to usage status information of the terminal device in the first data network and usage status information of the terminal device in the first slice, and the first indication information indicates that usage of the terminal device in the first data network and usage of the terminal device in the first slice are exhausted.

In a possible implementation method, the first policy control network element is further configured to: before sending the subscription message to the usage monitoring network element, receive, from the mobility management network element, a subscribed DNN and identification information of a slice that the terminal device is allowed to access, where the subscribed DNN includes the first DNN, and the slice that the terminal device is allowed to access includes the first slice.

In a possible implementation method, the first policy control network element is further configured to determine the first DNN in the subscribed DNN and the first slice in the slice that the terminal device is allowed to access.

In a possible implementation method, the first policy control network element is further configured to: before sending the subscription message to the usage monitoring network element, receive the first DNN, the identification information of the first slice, and second indication information from the mobility management network element, where the second indication information indicates to monitor a usage status of the terminal device in the first data network and a usage status of the terminal device in the first slice.

In a possible implementation method, that the first policy control network element is configured to receive the first indication information from the usage monitoring network element specifically includes: being configured to receive a usage status event report from the usage monitoring network element, where the usage status event report includes the first DNN, the identification information of the first slice, and the first indication information.

In a possible implementation method, the mobility management network element is configured to send an identifier of a second network to the terminal device, where the second network is a network that the terminal device is allowed to access, and the identifier of the second network does not include the identification information of the first network.

In a possible implementation method, the identification information of the first network is a first data network name (DNN), and the first DNN identifies a first data network. The mobility management network element is configured to: before receiving the availability status information of the first network from the policy control network element, send a subscribed DNN to the policy control network element, where the subscribed DNN includes the first DNN; or determine the first DNN in a subscribed DNN, and send the first DNN and indication information to the policy control network element, where the indication information indicates to monitor a usage status of the terminal device in the first data network.

In a possible implementation method, the identification information of the first network is a first data network name (DNN) and identification information of a first slice, and the first DNN identifies a first data network. The mobility management network element is configured to: before receiving the availability status information of the first network from the policy control network element, send, to the policy control network element, a subscribed DNN and identification information of a slice that the terminal device is allowed to access, where the subscribed DNN includes the first DNN, and the slice that the terminal device is allowed to access includes the first slice; or determine the first DNN in a subscribed DNN and the first slice in a slice that the terminal device is allowed to access, and send the first DNN, the identification information of the first slice, and indication information to the policy control network element, where the indication information indicates to monitor a usage status of the terminal device in the first data network and a usage status of the terminal device in the first slice.

In a Fourth Embodiment

The usage monitoring network element is configured to: obtain identification information of a terminal device and identification information of a first slice; determine that usage of the terminal device in the first slice is exhausted; and send first indication information to the first policy control network element, where the first indication information indicates that the usage of the terminal device in the first slice is exhausted. The first policy control network element is configured to: receive the first indication information from the usage monitoring network element; and send availability status information of the first slice to the mobility management network element, where the availability status information indicates that the first slice is unavailable; or send a user route selection policy to the terminal device, where the user route selection policy does not include the identification information of the first slice.

In a possible implementation method, that the usage monitoring network element is configured to: obtain identification information of a terminal device and identification information of a first slice includes: being configured to receive a subscription message from the first policy control network element, where the subscription message includes the identification information of the first slice and the identification information of the terminal device, and the subscription message is for subscribing to usage status information of the terminal device in the first slice.

In a Fifth Embodiment

The usage monitoring network element is configured to: obtain identification information of a first slice; determine that usage of the first slice is exhausted; and send first indication information to the first policy control network element, where the first indication information indicates that the usage of the first slice is exhausted. The first policy control network element is configured to: receive the first indication information from the usage monitoring network element; and send availability status information of the first slice to the mobility management network element, where the availability status information indicates that the first slice is unavailable; or send a user route selection policy to a terminal device allowed to access the first slice, where the user route selection policy does not include the identification information of the first slice.

In a possible implementation method, that the usage monitoring network element is configured to obtain identification information of a first slice includes: being configured to receive a subscription message from the first policy control network element, where the subscription message includes the identification information of the first slice, and the subscription message is for subscribing to usage status information of the first slice.

In a Sixth Embodiment

The usage monitoring network element is configured to: obtain identification information of a terminal device and identification information of a first network; determine that usage of the terminal device in the first network is exhausted; and send first indication information to the first policy control network element, where the first indication information indicates that the usage of the terminal device in the first network is exhausted. The first policy control network element is configured to: receive the first indication information from the usage monitoring network element; and send availability status information of the first network to the mobility management network element, where the availability status information indicates that the first network is unavailable; or send a user route selection policy to the terminal device, where the user route selection policy does not include the identification information of the first network.

In a possible implementation method, that the usage monitoring network element is configured to obtain identification information of a terminal device and identification information of a first network includes: being configured to receive a subscription message from the first policy control network element, where the subscription message includes the identification information of the first network and the identification information of the terminal device, and the subscription message is for subscribing to usage status information of the terminal device in the first network.

Specific implementations of the foregoing solutions are described in detail in the following method embodiments. Details are not described herein again.

Figure 2A:
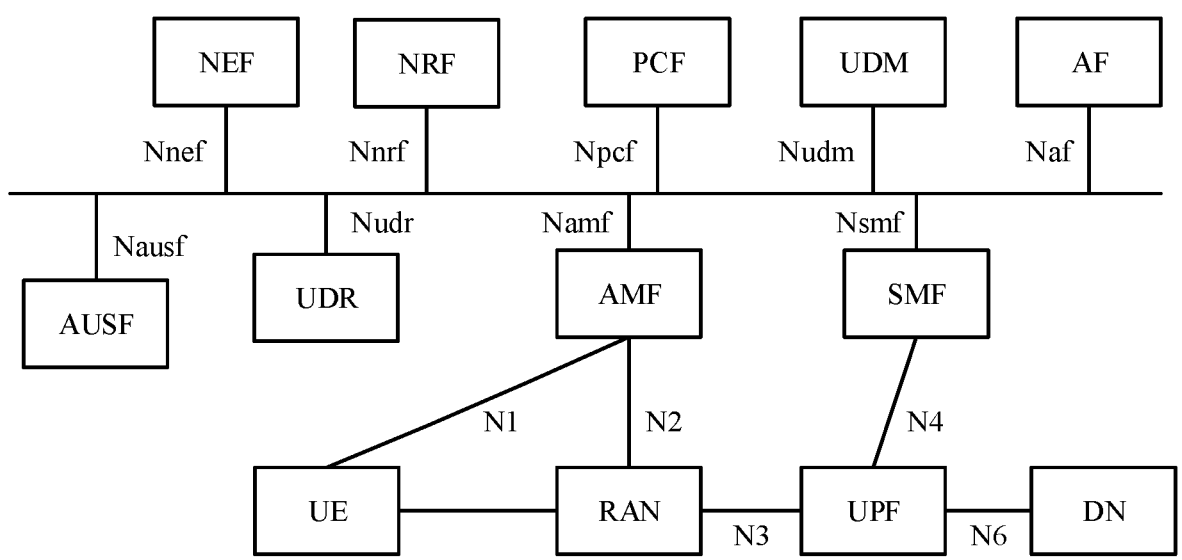
FIG. 2(a) is a schematic diagram of a 5G network architecture that is based on a service-based architecture.
Figure 2B:
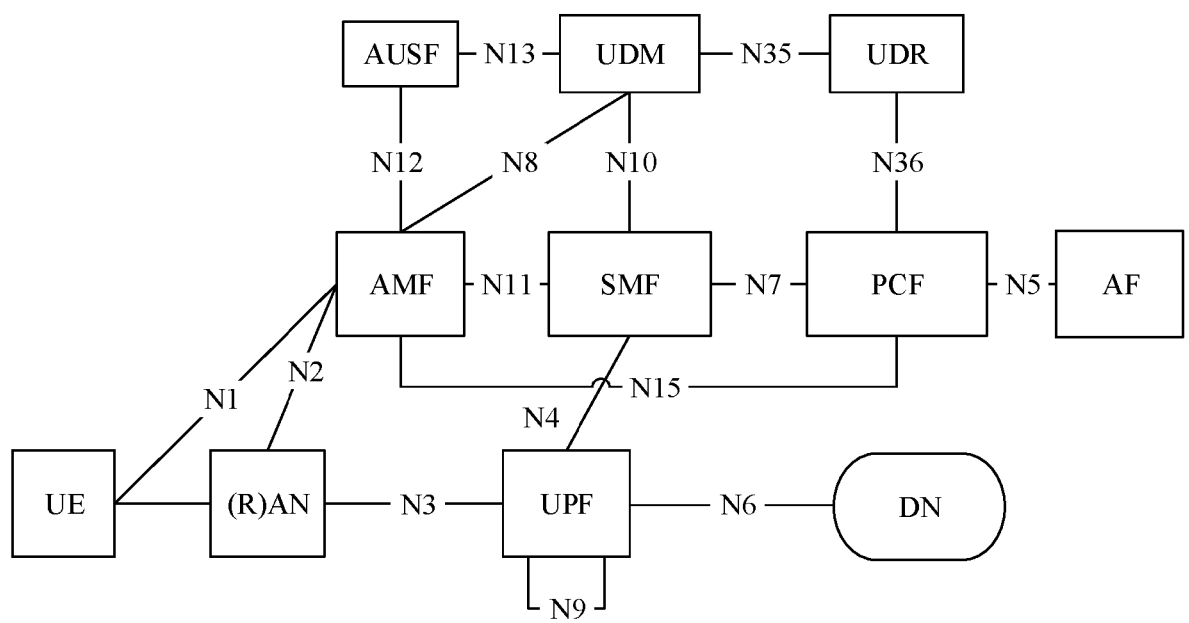
FIG. 2(b) is a schematic diagram of a 5G network architecture that is based on point-to-point interfaces.

The system shown in FIG. 1 may be used in a fifth generation (5G) network architecture shown in FIG. 2(a) or FIG. 2(b), or certainly, may be used in a future network architecture, for example, a 6th generation (6G) network architecture. This is not limited in this application.

For example, it is assumed that the communication system shown in FIG. 1 is used in a 5G network architecture. FIG. 2(a) is a schematic diagram of a 5G network architecture that is based on a service-based architecture. A network element or an entity corresponding to the first policy control network element in FIG. 1 may be a policy control function (policy control function, PCF) network element in the 5G network architecture shown in FIG. 2(a). A network element or an entity corresponding to the usage monitoring network element in FIG. 1 may be the PCF network element, a unified data repository (UDR), or a network data analysis function (NWDAF) network element (not shown in the figure) in the 5G network architecture shown in FIG. 2(a). A network element or an entity corresponding to the mobility management network element in FIG. 1 may be an access and mobility management function (AMF) network element in the 5G network architecture shown in FIG. 2(a).

The 5G network architecture shown in FIG. 2(a) may include three parts: a terminal device, a data network (DN), and a carrier network. The following briefly describes functions of some network elements.

The operator network may include one or more of the following network elements: an authentication server function (AUSF) network element, a network exposure function (NEF) network element, the PCF network element, a unified data management (UDM) network element, the UDR, a network repository function (NRF) network element, an application function (AF) network element, an AMF network element, a session management function (SMF) network element, a radio access network (RAN), a user plane function (UPF) network element, and the like. In the foregoing carrier network, a part other than the radio access network may be referred to as a core network.

During specific implementation, the terminal device in embodiments of this application may be a device configured to implement a wireless communication function. The terminal device may be a user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

The terminal device may establish a connection to the carrier network through an interface (for example, N1) provided by the carrier network, and use services such as a data service and/or a voice service provided by the carrier network. The terminal device may further access the DN through the carrier network, and use a carrier service deployed on the DN and/or a service provided by a third party. The third party may be a service provider other than the carrier network and the terminal device, and may provide services such as a data service and/or a voice service for the terminal device. A specific representation form of the third party may be specifically determined based on an actual application scenario, and is not limited herein.

The RAN is a sub-network of the carrier network, and is an implementation system between a service node in the carrier network and the terminal device. To access the carrier network, the terminal device first passes through the RAN, and may be connected to the service node in the carrier network through the RAN. A RAN device in this application is a device that provides the wireless communication function for the terminal device, and the RAN device is also referred to as an access network device. The RAN device in this application includes but is not limited to: a next generation NodeB (gNB) in 5G, an evolved NodeB (eNB), a radio network controller (RNC), a NodeB (NB), a base station controller (BSC), a base transceiver station (base transceiver station, BTS), a home base station (for example, a home evolved NodeB or a home NodeB, HNB), a baseband unit (BBU), a transmission reception point (TRP), a transmission point (TP), a mobile switching center, and the like.

The AMF network element mainly performs functions such as mobility management, and access authentication/authorization. In addition, the AMF network element is further responsible for transferring a user policy between the UE and the PCF.

The SMF network element mainly performs functions such as session management, execution of a control policy delivered by the PCF, UPF selection, and UE internet protocol (IP) address assignment.

The UPF network element serves as an interface UPF of the data network, and implements functions such as user plane data forwarding, charging statistics based on a session/flow level, and bandwidth throttling.

The UDM network element is mainly responsible for functions such as subscription data management and user access authorization.

The UDR is mainly responsible for a function of accessing data of types such as subscription data, policy data, and application data.

The NEF network element is mainly configured to support capability and event exposure.

The AF network element mainly transfers a requirement of an application side on a network side, for example, a quality of service (QoS) requirement or user status event subscription. The AF may be a third-party functional entity, or may be an application service deployed by a carrier, for example, an IP multimedia subsystem (IMS) voice call service.

The PCF network element is mainly responsible for policy control functions such as charging for a session level or a service flow level, QoS bandwidth guarantee, mobility management, and UE policy decision. In the architecture, a PCF to which the AMF is connected may provide access and mobility control (a PCF for Access and Mobility Control), and may provide UE policy control (a PCF for UE Policy Control). Alternatively, it is understood as that a PCF to which the AMF is connected includes an AM PCF and a UE PCF. A PCF to which the SMF is connected may provide session management (a PCF for Session Management). Alternatively, it is understood as that a PCF to which the SMF is connected is referred to as an SM PCF. During actual deployment, the PCF to which the AMF is connected and the PCF to which the SMF is connected may be a same PCF, or may be different PCFs.

The NRF network element may be configured to provide a network element discovery function and provide, based on a request from another network element, network element information corresponding to a network element type. The NRF further provides a network element management service, for example, registration, update, and deregistration of a network element and subscription and push of a network element status.

The AUSF network element is mainly responsible for user authentication, to determine whether to allow a user or a device to access a network.

The DN is a network outside the carrier network. The carrier network may access a plurality of DNs. A plurality of services may be deployed in the DN, and the DN may provide services such as a data service and/or a voice service for the terminal device. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transmit collected sensor data to the control server according to the instructions, and so on. For another example, the DN is an internal office network of a company, a mobile phone or a computer of an employee of the company may be a terminal device, and the mobile phone or the computer of the employee may access information, data resources, and the like in the internal office network of the company.

Nausf, Nnef, Npcf, Nudm, Naf, Namf, Nsmf, N1, N2, N3, N4, and N6 in FIG. 2(a) are interface serial numbers. For meanings of the interface serial numbers, refer to definitions in a 3GPP standard protocol. This is not limited herein.

For example, it is assumed that the communication system shown in FIG. 1 is used in a 5G network architecture. FIG. 2(b) is a schematic diagram of a 5G network architecture that is based on point-to-point interfaces. A network element or an entity corresponding to the first policy control network element in FIG. 1 may be a PCF network element in the 5G network architecture shown in FIG. 2(b). A network element or an entity corresponding to the usage monitoring network element in FIG. 1 may be the PCF network element, a UDR, or an NWDAF network element (not shown in the figure) in the 5G network architecture shown in FIG. 2(b). A network element or an entity corresponding to the mobility management network element in FIG. 1 may be an AMF network element in the 5G network architecture shown in FIG. 2(b).

For descriptions of functions of network elements in FIG. 2(b), refer to the descriptions of the functions of the corresponding network element in FIG. 2(a). Details are not described again. A main difference between FIG. 2(b) and FIG. 2(a) lies in that interfaces between the network elements in FIG. 2(b) are point-to-point interfaces rather than service-oriented interfaces.

In the architecture shown in FIG. 2(b), names and functions of the interfaces between the network elements are as follows:

(1) N7 represents an interface between the PCF and an SMF, and is configured to deliver a protocol data unit (PDU) session granularity control policy and a service data flow granularity control policy.

(2) N15 represents an interface between the PCF and the AMF, and is configured to deliver a UE policy and an access control related policy.

(3) N5 represents an interface between an AF and the PCF, and is configured to deliver an application service request and report a network event.

(4) N4 represents an interface between the SMF and a UPF, and is configured to transfer information between a control plane and a user plane, including delivery of a forwarding rule, a QoS control rule, a traffic statistics rule, and the like from the control plane to the user plane, and reporting of user plane information.

(5) N11 represents an interface between the SMF and the AMF, and is configured to: transfer PDU session tunnel information between a RAN and the UPF, transfer a control message to be sent to a UE, transfer radio resource control information to be sent to the RAN, and so on.

(6) N2 represents an interface between the AMF and the RAN, and is configured to transfer radio bearer control information and the like from a core network side to the RAN.

(7) N1 represents an interface between the AMF and the UE, is access-irrelevant, and is configured to transfer the QoS control rule and the like to the UE.

(8) N8 represents an interface between the AMF and a UDM, and is used by the AMF to obtain, from the UDM, subscription data and authentication data that are related to access and mobility management, and used by the AMF to register current mobility management related information of the UE with the UDM.

(9) N10 represents an interface between the SMF and the UDM, and is used by the SMF to obtain, from the UDM, subscription data related to session management, and used by the SMF to register current session related information of the UE with the UDM.

(10) N35 represents an interface between the UDM and the UDR, and is used by the UDM to obtain user subscription data information from the UDR.

(11) N36 represents an interface between the PCF and the UDR, and is used by the PCF to obtain policy related subscription data and application data related information from the UDR.

(12) N12 represents an interface between the AMF and an AUSF, and is used by the AMF to initiate an authentication procedure to the AUSF, where an SUCI may be carried as a subscription identifier.

(13) N13 represents an interface between the UDM and the AUSF, and is used by the AUSF to obtain a user authentication vector from the UDM, to perform the authentication procedure.

It may be understood that the foregoing network elements or the functions may be network elements in a hardware device, software functions running on dedicated hardware, or virtualized functions instantiated on a platform (for example, a cloud platform). Optionally, the foregoing network elements or the functions may be implemented by one device, may be jointly implemented by a plurality of devices, or may be one function module in one device. This is not specifically limited in embodiments of this application.

A mobility management network element, a session management network element, a policy control network element, an application function network element, an access network device, and a user plane network element in this application may be respectively the AMF, the SMF, the PCF, the AF, the RAN, and the UPF in FIG. 2(a) or FIG. 2(b), or may be network elements that have the functions of the AMF, the SMF, the PCF, the AF, the RAN, and the UPF in a future communication network, for example, a 6th generation (6G) network. This is not limited in this application. For ease of description, in this application, descriptions are provided by using an example in which the mobility management network element, the session management network element, the policy control network element, the application function network element, the access network device, and the user plane network element are respectively the AMF, the SMF, the PCF, the AF, the RAN, and the UPF. Further, a terminal device is referred to as a UE for short in this application.

For ease of understanding the solutions in this application, the following first describes the related background.

1. General User Registration Procedure

The general user registration procedure may be briefly described as follows: The UE sends a registration request to the AMF through the RAN. The AMF obtains subscription data from a specific UDM based on a subscription permanent identifier (SUPI). After receiving the request, the UDM may obtain actual subscription data from a UDR. In addition, the AMF may further initiate a user policy association establishment request (UEPolicyControl_Create Request) and an access management policy association establishment request (AMPolicyControl_Create Request) to the PCF, to respectively obtain a UE policy and an access control policy respectively. In this process, the PCF returns the access control policy to the AMF, and provides the UE policy for the UE through the AMF.

2. General Session Establishment Procedure

The general session establishment procedure may be briefly described as follows: The UE sends a session establishment request to the AMF through the RAN. The AMF selects an SMF to serve a session, stores a correspondence between the SMF and a PDU session, and sends a session establishment request to the SMF. The SMF selects a corresponding UPF for the UE, establishes a user plane transmission path, and allocates an IP address to the UE. In this process, the SMF further initiates a policy control session establishment request to the PCF, to establish a policy control session between the SMF and the PCF. In a policy control session establishment process, the SMF stores a correspondence between the policy control session and the PDU session. In addition, an AF may establish an AF session with the PCF, and the PCF binds the AF session to the policy control session.

3. Allowed Network Slice Selection Assistance Information (NSSAI) (Allowed NSSAI)

To implement slice access control, in a registration procedure, the AMF may determine, based on information such as requested NSSAI from the UE, subscribed NSSAI from a UDM, and a locally configured carrier policy, to generate the allowed NSSAI as an identifier of a slice that a network side allows the UE to use. Optionally, a network slice selection function (NSSF) network element may alternatively participate in the process. To be specific, the AMF provides slice-related input such as the currently received subscribed NSSAI and requested NSSAI and information such as a public land mobile network (PLMN) identity (ID) and a tracking area identity (TAI), so that the NSSF determines allowed NSSAI of the UE. In an inter-network handover scenario, the AMF may alternatively provide slice information of the UE in a home network, to request the NSSF to determine allowed NSSAI of the UE.

Specifically, the requested NSSAI of the UE may be obtained by the UE by performing combination based on default configured NSSAI and allowed NSSAI that is in a current access mode. This is not limited in embodiments of this application.

4. 5G policy Architecture

In a current 5G architecture, a PCF (where the PCF includes an AM PCF and a UE PCF) directly connected to the AMF can provide the following policies for the AMF or provide the following policies for the UE through the AMF:

(1) User policy (UE Policy) provided by the UE PCF for the UE through the AMF.

The user policy mainly includes an access network discovery and selection policy (ANDSP) and a UE route selection policy (URSP). The user policy is provided by the UE PCF for the UE through the AMF.

The ANDSP is mainly used by the UE to select an access network and select an access network element when the UE performs non-3GPP access. The URSP is a policy rule used by the UE to select, when the UE initiates an application or a service, a corresponding route parameter, for example, a data network name (DNN), single network slice selection assistance information (S-NSSAI), or a session and service continuity mode (SSC mode) required for the application or the service.

(2) Access and mobility management policy provided by the AM PCF for the AMF.

The access and mobility management policy mainly includes a service area restriction and radio access technology/frequency selection policy (RFSP).

The service area restriction mainly includes information such as an area that a user is allowed to access and an area that the user is forbidden from accessing. For example, the user is forbidden from accessing a carrier network in a special management and control area. The RFSP is mainly used by the user to select an access mode and a frequency. For example, when a part of cells are congested, the RFSP policy is adjusted to guide a user in the congested cell to migrate to another cell.

In the current 5G architecture, a PCF (where the PCF may also be referred to as an SM PCF) directly connected to the SMF can provide a session management policy for the SMF. The session management policy includes information such as a QoS policy, charging control, and traffic steering control that are at a service flow level or a session level, for example, a policy and charging control rule (PCC rule) at the service flow level and PDU session policy control information at the session level.

5. User Policy Mechanism

Two user policies are defined in the current standard: the ANDSP and the URSP. Embodiments of this application mainly relate to a URSP scenario.

The URSP mainly includes two parts: a traffic descriptor (Traffic descriptor) and a list of route selection descriptors (RSD list). The traffic descriptors include, for example, an operating system identifier (OS ID), an application identifier (APP ID), an IP 3 tuple, or a domain descriptor. The route selection descriptors include the S-NSSAI, the DNN, the SSC mode, and the like.

A process of performing URSP matching by the UE is as follows: When determining that a specific service or application needs to be initiated, the UE matches, in sequence based on priorities of URSPs, the to-be-initiated service or application with traffic descriptors in the received URSPs. If a specific URSP is matched (where the URSP may alternatively be a default URSP, for example, a traffic descriptor is in a Match-all form), the UE further needs to determine whether S-NSSAI included in an RSD in the URSP satisfies a limitation of allowed NSSAI. If the S-NSSAI in the RSD does not belong to the allowed NSSAI, the UE continues to determine, based on priorities of RSDs, whether a next RSD satisfies the condition. If the condition is satisfied, the UE further needs to determine whether an existing PDU session satisfies a definition of the RSD.

(1) If information, for example, a DNN, S-NSSAI, and an SSC mode, corresponding to the existing PDU session is all consistent with corresponding information in route selection descriptors corresponding to the matched URSP, the UE may choose to initiate a PDU session modification request based on the existing PDU session. The PDU session modification request may carry parameters including a current PDU session ID and an N1 SM container (PDU Session Modification Request (PDU Session ID, packet filters, Operation, and Requested QoS)). The PDU session ID is used by the AMF to associate with a specific session context. The N1 SM container is transparently transmitted by the AMF to the SMF, to indicate the specific service that the UE intends to initiate and a QoS guarantee required for the service.

(2) If all of the existing PDU session(s) cannot match RSDs in the URSP, the UE initiates a PDU session establishment request for the service/application, and includes, in the request message sent to the AMF, parameters such as a newly allocated PDU session ID, and a DNN, S-NSSAI, and an N1 SM container (SSC mode and PDU session type) in the RSDs. The newly allocated PDU session ID identifies a PDU session corresponding to the PDU session establishment request. The DNN and the S-NSSAI are used as parameters used by the AMF to select an SMF entity for the PDU session establishment request. The N1 SM container is transparently transmitted by the AMF to the selected SMF.

In a conventional technology, in a scenario (referred to as a scenario 1 below), a UE subscribes to a service of a high-priority slice or some high-priority slices from a carrier in a form of a user-granularity value-added service, and is allowed to use a service with a specific quota, for example, traffic or use duration, in the slice. When the quota of the UE in the slice is exhausted, the UE is allowed, based on subscription, to use only a common slice to access a corresponding service. That is, the UE is no longer allowed to use the subscribed high-priority slice.

In another scenario (referred to as a scenario 2 below), a slice tenant (for example, an enterprise) subscribes, at a slice granularity from a carrier, to a service that is of a slice and that satisfies a specific indicator, and a network side performs usage control of the slice granularity. For example, a UDR or an NWDAF network element performs usage control on the slice based on usage information reported by a peripheral network element. When a usage quota of the slice is exhausted, a UE in the slice is not allowed, based on subscription, to access a corresponding service by using the slice.

In the foregoing scenario 1 and scenario 2, the operator performs usage monitoring based on the slice granularity. In another scenario (referred to as a scenario 3 below), in some carrier network deployment, usage monitoring may alternatively be performed based on a data network granularity (also referred to as a DNN granularity) or a data network and slice granularity (also referred to as a DNN and S-NSSAI granularity), and a URSP is adjusted based on a usage monitoring result, to prevent a UE from continuing to request access to a corresponding DNN or DNN and S-NSSAI.

With reference to the foregoing scenarios, currently, there is no corresponding solution to how to adjust, when usage of a UE in a slice, usage of the slice, usage of the UE in a data network, or usage of the UE in the data network and the slice is exhausted, a corresponding parameter so that the UE no longer continues to use a service of the slice.

Figure 3A:
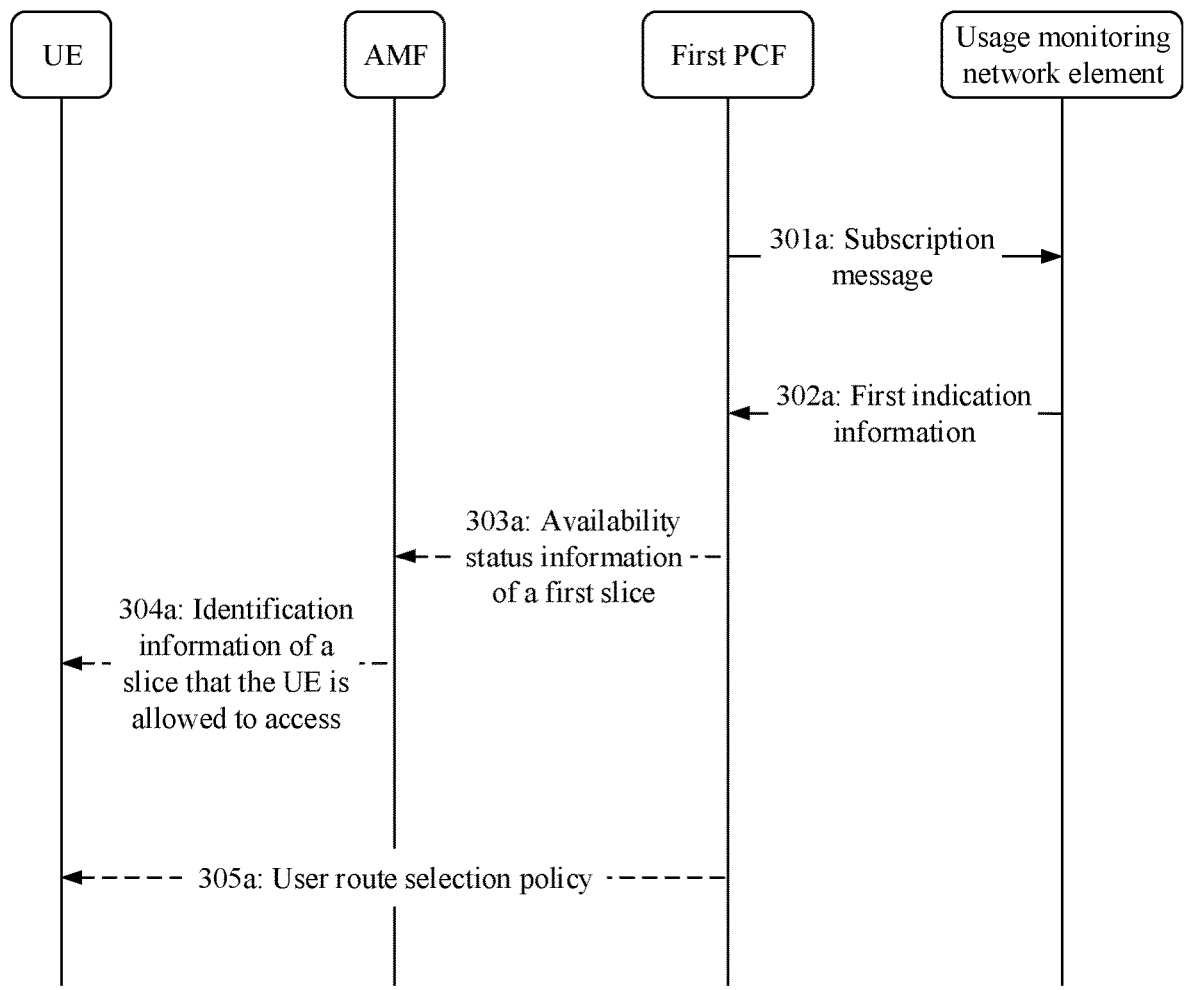
FIG. 3(a) is a schematic flowchart of a communication method according to this application.

To resolve the foregoing problem, based on the network architecture shown in FIG. 2(a) or FIG. 2(b), as shown in FIG. 3(a), this application provides a communication method. The method may be applied to a handover procedure (for example, handover from 4G to 5G or handover from 5G to 5G), an initial registration procedure, or the like.

This embodiment is a solution to the foregoing scenario 1. In this solution, when a quota of a UE in a first slice is exhausted, a slice that the UE is allowed to access is adjusted in time, to avoid an error caused because the UE is still guided to the first slice when the quota of the UE in the first slice is exhausted.

The method includes the following steps.

Step 301a: A first PCF sends a subscription message to a usage monitoring network element. Correspondingly, the usage monitoring network element may receive the subscription message.

The subscription message includes identification information of the first slice and identification information of the UE, and the subscription message is for subscribing to usage status information of the UE in the first slice.

The first slice herein may be one or more slices.

That is, there is a quota limit on the UE in the first slice. For example, the quota of the UE in the first slice is equal to a quota of the first slice multiplied by a preset percentage. The quota herein may be traffic, duration, or the like. For example, a traffic quota of the first slice is 100 G, a quota of a UE 1 in the first slice is 1 G, and a quota of a UE 2 in the first slice is 1.5 G.

The first PCF herein serves an AMF. The first PCF includes an AM PCF and a UE PCF. Alternatively, it is understood as that the first PCF has a function of an AM PCF and a function of a UE PCF.

In an implementation method, the usage monitoring network element herein may be a second PCF. The second PCF serves an SMF. The second PCF may also be referred to as an SM PCF.

In another implementation method, the usage monitoring network element herein may be a UDR.

In another implementation method, the usage monitoring network element herein may alternatively be an NWDAF network element.

Step 302a: The usage monitoring network element sends first indication information to the first PCF. Correspondingly, the first PCF may receive the first indication information.

After receiving the subscription message, the usage monitoring network element monitors a usage status of the UE in the first slice, and then sends the first indication information to the first PCF when finding that usage of the UE in the first slice is exhausted, where the first indication information indicates that the usage of the UE in the first slice is exhausted.

In a specific implementation method, step 302a may be: The first PCF receives a slice usage status event report from the usage monitoring network element, where the slice usage status event report includes the identification information of the first slice and the first indication information.

After receiving the first indication information, the first PCF may notify the AMF that the first slice is unavailable, and then the AMF notifies the UE not to use the first slice (corresponding to the following step 303a and step 304a). Alternatively, after the first PCF receives the first indication information, the first PCF notifies, by using a user route selection policy, the UE not to use the first slice (corresponding to the following step 305a). During actual application, either of the manners may be selected for execution.

Step 303a: The first PCF sends availability status information of the first slice to the AMF. Correspondingly, the AMF may receive the availability status information of the first slice.

The availability status information indicates that the first slice is unavailable. Alternatively, it is understood as that the availability status indicates that the UE cannot use the first slice.

Step 304a: The AMF sends, to the UE, identification information of a slice that the UE is allowed to access. Correspondingly, the UE may receive the identification information of the slice that the UE is allowed to access.

The identification information of the slice that the UE is allowed to access does not include the identification information of the first slice.

In a specific implementation method, the identification information of the slice that the UE is allowed to access may be represented by allowed NSSAI, and the allowed NSSAI of the UE does not include the identification information of the first slice. In this way, the UE does not access the first slice.

The identification information of the slice that the UE is allowed to access does not include the identification information of the first slice, and the UE does not subsequently use a service of the first slice. Therefore, after the usage of the UE in the first slice is exhausted, the UE can be prevented from continuing to use the service of the first slice. This helps implement correct communication.

Optionally, step 305a is further included.

Step 305a: The first PCF sends the user route selection policy to the UE. Correspondingly, the UE may receive the user route selection policy.

The user route selection policy of the UE does not include the identification information of the first slice.

The user route selection policy of the UE does not include the identification information of the first slice, and the UE does not subsequently use the service of the first slice. Therefore, after the usage of the UE in the first slice is exhausted, the UE can be prevented from continuing to use the service of the first slice. This helps implement correct communication.

In an implementation method, before step 301a, the first PCF further determines, according to the following implementation methods and the like, that the usage of the UE in the first slice needs to be monitored.

Implementation method 1: The AMF sends, to the first PCF, identification information of slices that the UE is allowed to access, where the identification information of the slices that the UE is allowed to access includes the identification information of the first slice. After receiving the identification information of the slices that the UE is allowed to access, the first PCF may determine, according to a carrier policy, that there is a usage limit on the UE in the first slice, and then determine that the usage of the UE in the first slice needs to be monitored.

Based on the implementation method, in an implementation, the subscription message in step 301a may include the identification information of the slices that the UE is allowed to access. After receiving the identification information of the slices that the UE is allowed to access, the usage monitoring network element determines that usage monitoring needs to be performed on the UE in the first slice. Alternatively, in another implementation, the subscription message in step 301a includes the identification information of the first slice, and does not include identification information other than the identification information of the first slice in the identification information of the slices that the UE is allowed to access.

Implementation method 2: The AMF determines identification information of a slice that the UE is allowed to access, where the identification information of the slice that the UE is allowed to access includes the identification information of the first slice. Then, the AMF determines, according to a carrier policy, that there is a usage limit on the UE in the first slice, and then sends the identification information of the first slice and second indication information to the first PCF, where the second indication information indicates to monitor the usage status of the UE in the first slice.

Figure 3B:
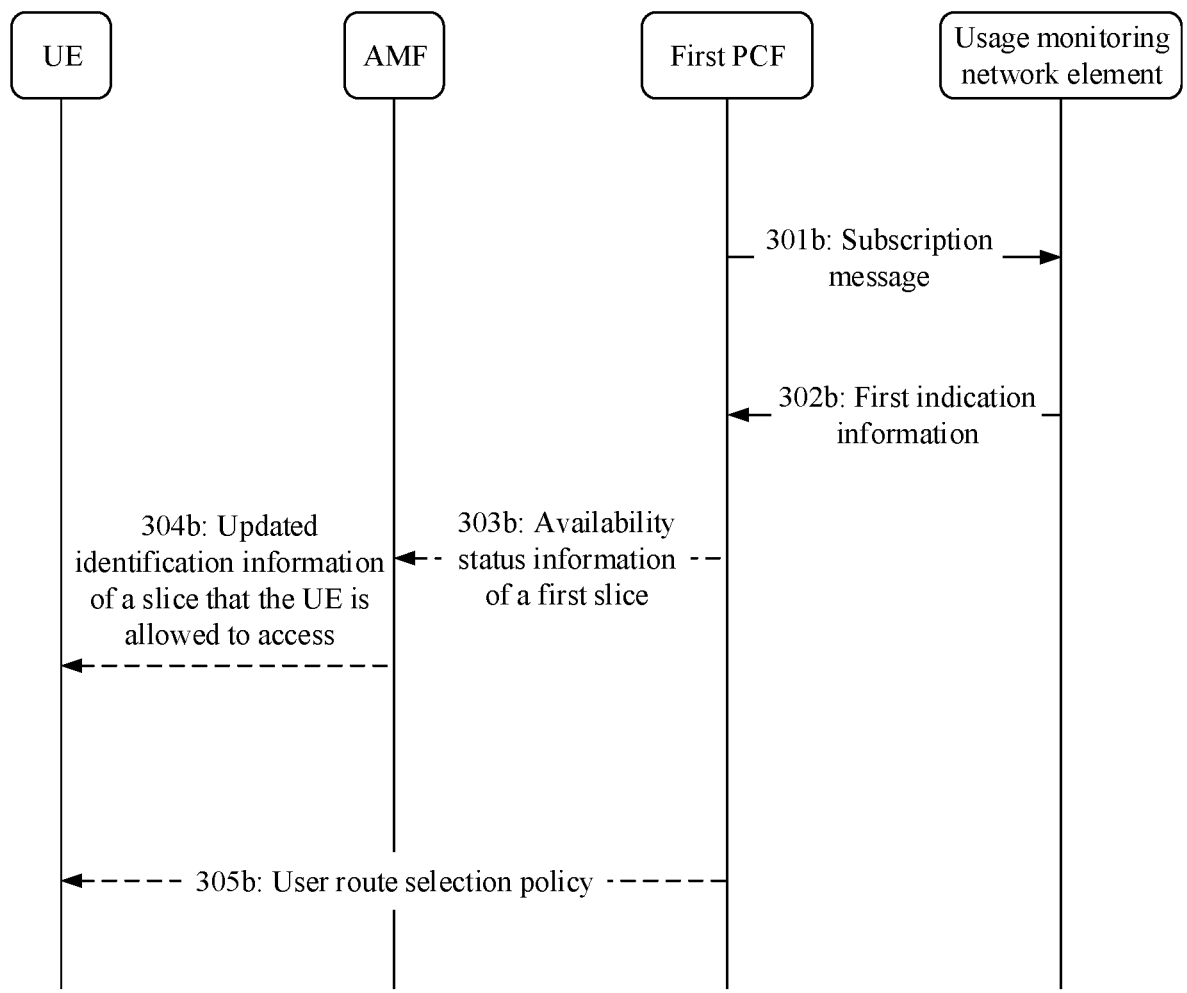
FIG. 3(b) is a schematic flowchart of another communication method according to this application.

To resolve the foregoing problem, based on the network architecture shown in FIG. 2(a) or FIG. 2(b), as shown in FIG. 3(b), this application provides another communication method. The method may be applied to a handover procedure (for example, handover from 4G to 5G or handover from 5G to 5G), an initial registration procedure, or the like.

This embodiment is a solution to the foregoing scenario 2. In this solution, when a quota of a first slice is exhausted, a slice that a UE in the first slice may access is adjusted in time, to avoid an error caused because the UE in the first slice continues to use the first slice when the quota of the first slice is exhausted.

The method includes the following steps.

Step 301b: A first PCF sends a subscription message to a usage monitoring network element. Correspondingly, the usage monitoring network element may receive the subscription message.

The subscription message includes identification information of the first slice, and the subscription message is for subscribing to usage status information of the first slice.

The first slice herein may be one or more slices.

That is, there is a quota limit on the first slice. The quota herein may be traffic, duration, or the like. For example, a traffic quota of the first slice is 100 G.

It should be noted that all UEs allowed to access the first slice may use the quota of the first slice, and a quota of each UE is the quota of the first slice. For example, if the traffic quota of the first slice is 100 G, a traffic quota that may be shared by all the UEs allowed to access the slice is also 100 G.

The first PCF herein serves an AMF. The first PCF includes an AM PCF and a UE PCF. Alternatively, it is understood as that the first PCF has a function of an AM PCF and a function of a UE PCF.

In an implementation method, the usage monitoring network element herein may be a UDR.

In another implementation method, the usage monitoring network element herein may alternatively be an NWDAF network element.

Step 302b: The usage monitoring network element sends first indication information to the first PCF. Correspondingly, the first PCF may receive the first indication information.

After receiving the subscription message, the usage monitoring network element monitors a usage status of the first slice, and then sends the first indication information to the first PCF when finding that usage of the first slice is exhausted, where the first indication information indicates that the usage of the first slice is exhausted.

In a specific implementation method, step 302b may be: The first PCF receives a slice usage status event report from the usage monitoring network element, where the slice usage status event report includes the identification information of the first slice and the first indication information.

After receiving the first indication information, the first PCF may notify the AMF that the first slice is unavailable, and then the AMF notifies the UE allowed to access the first slice not to use the first slice (corresponding to the following step 303b and step 304b). Alternatively, after the first PCF receives the first indication information, the first PCF notifies, by using a user route selection policy, the UE allowed to access the first slice not to use the first slice (corresponding to the following step 305b). During actual application, either of the manners may be selected for execution.

Step 303b: The first PCF sends availability status information of the first slice to the AMF. Correspondingly, the AMF may receive the availability status information of the first slice.

The availability status information indicates that the first slice is unavailable. Alternatively, it is understood as that the availability status indicates that the UE allowed to access the first slice cannot use the first slice.

Step 304b: The AMF sends, to the UE, updated identification information of a slice that the UE is allowed to access. Correspondingly, the UE may receive the updated identification information of the slice that the UE is allowed to access.

The UE herein is the UE allowed to access the first slice. The UE allowed to access the first slice may be one or more UEs. Alternatively, it is understood as that an identifier (Allowed NSSAI) that is received by the UE herein and that is of a slice that the UE is allowed to access or a subscribed slice identifier (Subscribed NSSAI) of the UE herein includes the identification information of the first slice. To be specific, in any step before step 304b or another procedure, the UE may receive the allowed NSSAI, where the allowed NSSAI includes the identification information of the first slice, and/or the subscribed NSSAI of the UE includes the identification information of the first slice. This indicates that the UE may access the first slice.

In step 303b, because the AMF receives the availability status information of the first slice, where the availability status information indicates that the first slice is unavailable, in step 304b, the AMF needs to notify the UE allowed to access the first slice that the first slice is no longer available or is temporarily unavailable. Therefore, in step 304b, the AMF may send, to the UE, the updated identification information (or referred to as new allowed NSSAI) of the slice that the UE is allowed to access, where the updated identification information does not include the identification information of the first slice.

The updated identification information of the slice that the UE is allowed to access does not include the identification information of the first slice, and the UE does not subsequently use a service of the first slice. Therefore, after the usage of the first slice is exhausted, the corresponding UE can be prevented from continuing to use the service of the first slice. This helps implement correct communication.

Step 305b: The first PCF sends a user route selection policy to the UE. Correspondingly, the UE may receive the user route selection policy.

The UE herein is the UE allowed to access the first slice. The UE allowed to access the first slice may be one or more UEs.

The user route selection policy of the UE does not include the identification information of the first slice.

The user route selection policy of the UE allowed to access the first slice does not include the identification information of the first slice, and the UE does not subsequently use the service of the first slice. Therefore, after the usage of the first slice is exhausted, the UE allowed to access the first slice can be prevented from continuing to use the service of the first slice. This helps implement correct communication.

In an implementation method, before step 301b, the first PCF further determines that usage of the UE in the first slice needs to be monitored. For example, this may be implemented by using the following method: The AMF may determine, according to a carrier policy, the first slice in which usage monitoring needs to be performed and that is in a slice supported by the AMF, and then the AMF sends the identification information of the first slice and indication information to the first PCF, where the indication information indicates to monitor the usage status of the first slice.

Figure 3C:
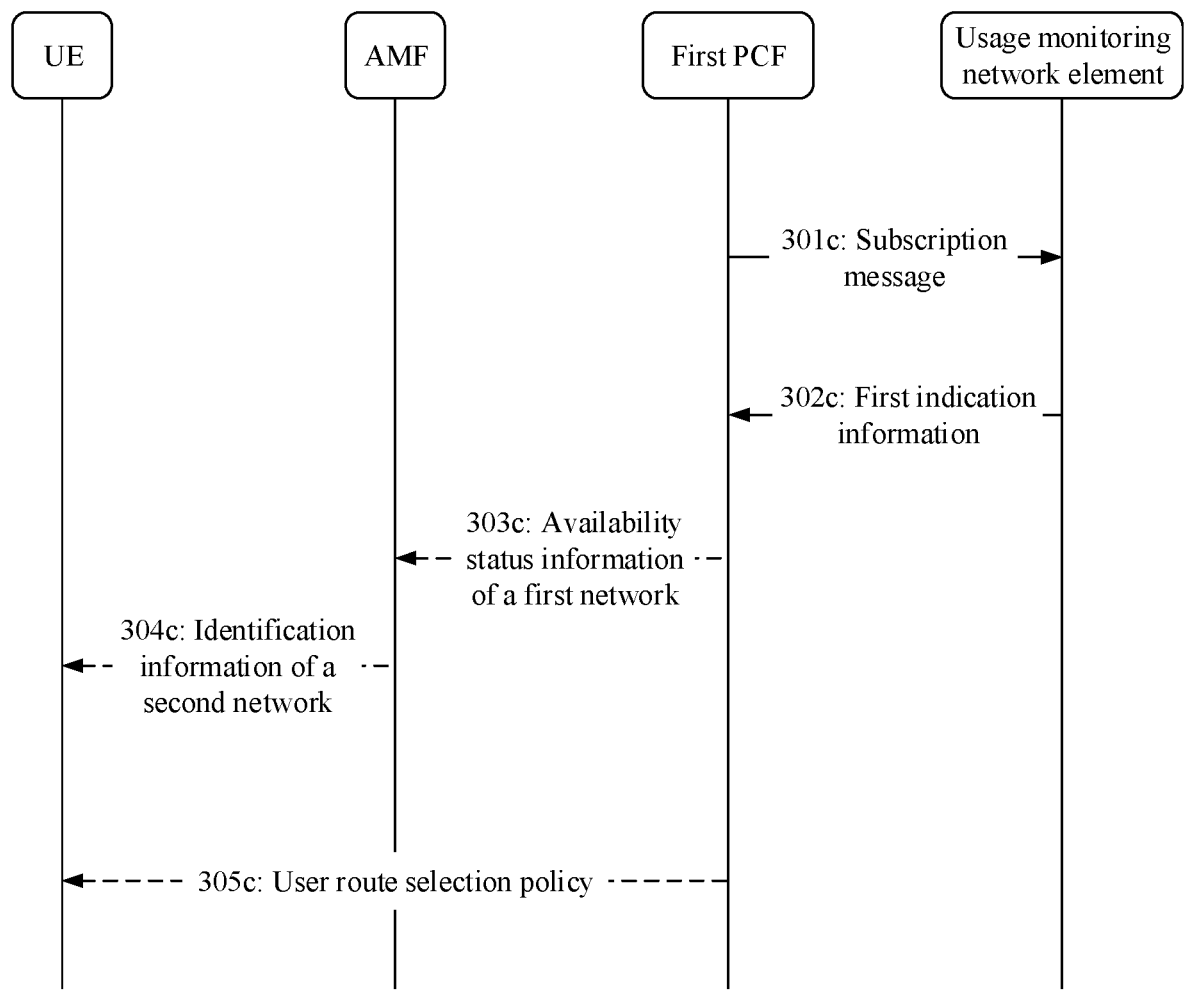
FIG. 3(c) is a schematic flowchart of another communication method according to this application.

To resolve the foregoing problem, based on the network architecture shown in FIG. 2(a) or FIG. 2(b), as shown in FIG. 3(c), this application provides a communication method. The method may be applied to a handover procedure (for example, handover from 4G to 5G or handover from 5G to 5G), an initial registration procedure, or the like.

This embodiment is a solution to the foregoing scenario 3. In this solution, when a quota of a UE in a first network is exhausted, the UE is notified in time, to avoid an error caused because the UE is still guided to the first network when the quota of the UE in the first network is exhausted.

The method includes the following steps.

Step 301c: A first PCF sends a subscription message to a usage monitoring network element. Correspondingly, the usage monitoring network element may receive the subscription message.

The subscription message includes identification information of the first network and identification information of the UE, and the subscription message is for subscribing to usage status information of the UE in the first network.

In an implementation method, the first network is a first data network, and the identification information of the first network is a first DNN.

In another implementation method, the first network is a combination of a first data network and a first slice, and the identification information of the first network is a first DNN and identification information of the first slice.

The first network herein may be one or more networks.

That is, there is a quota limit on the UE in the first network. For example, the quota of the UE in the first network is equal to a quota of the first network multiplied by a preset percentage. The quota herein may be traffic, duration, or the like. For example, a traffic quota of the first network is 100 G, a quota of a UE 1 in the first network is 1 G, and a quota of a UE 2 in the first network is 1.5 G.

The first PCF herein serves an AMF. The first PCF includes an AM PCF and a UE PCF. Alternatively, it is understood as that the first PCF has a function of an AM PCF and a function of a UE PCF.

In an implementation method, the usage monitoring network element herein may be a second PCF. The second PCF serves an SMF. The second PCF may also be referred to as an SM PCF.

In another implementation method, the usage monitoring network element herein may be a UDR.

In another implementation method, the usage monitoring network element herein may alternatively be an NWDAF network element.

Step 302c: The usage monitoring network element sends first indication information to the first PCF. Correspondingly, the first PCF may receive the first indication information.

After receiving the subscription message, the usage monitoring network element monitors a usage status of the UE in the first network, and then sends the first indication information to the first PCF when finding that usage of the UE in the first network is exhausted, where the first indication information indicates that the usage of the UE in the first network is exhausted.

In a specific implementation method, step 302c may be: The first PCF receives a usage status event report from the usage monitoring network element, where the usage status event report includes the identification information of the first network and the first indication information.

After receiving the first indication information, the first PCF may notify the AMF that the first network is unavailable, and then the AMF notifies the UE not to use the first network (corresponding to the following step 303c and step 304c). Alternatively, after the first PCF receives the first indication information, the first PCF notifies, by using a user route selection policy, the UE not to use the first network (corresponding to the following step 305c). During actual application, either of the manners may be selected for execution.

Step 303c: The first PCF sends availability status information of the first network to the AMF. Correspondingly, the AMF may receive the availability status information of the first network.

The availability status information indicates that the first network is unavailable. Alternatively, it is understood as that the availability status indicates that the UE cannot use the first network.

Step 304c: The AMF sends identification information of a second network to the UE. Correspondingly, the UE may receive the identification information of the second network.

The identification information of the second network may alternatively be understood as identification information of a network that the UE is allowed to access.

The identification information of the second network does not include the identification information of the first network.

The identification information of the second network does not include the identification information of the first network, and the UE does not subsequently use a service of the first network. Therefore, after the usage of the UE in the first network is exhausted, the UE can be prevented from continuing to use the service of the first network. This helps implement correct communication.

Optionally, step 305c is further included.

Step 305c: The first PCF sends the user route selection policy to the UE. Correspondingly, the UE may receive the user route selection policy.

The user route selection policy of the UE does not include the identification information of the first network.

The user route selection policy of the UE does not include the identification information of the first network, and the UE does not subsequently use the service of the first network. Therefore, after the usage of the UE in the first network is exhausted, the UE can be prevented from continuing to use the service of the first network. This helps implement correct communication.

In an implementation method, before step 301c, the first PCF further determines, according to the following implementation methods and the like, that the usage of the UE in the first network needs to be monitored.

Scenario 1: The identification information of the first network is the first DNN.

In the scenario 1, the first PCF further determines, according to the following implementation methods 1 and 2, and the like, that the usage of the UE in the first network needs to be monitored.

Implementation method 1: The AMF sends subscribed DNNs to the first PCF, where the subscribed DNNs include the first DNN. After receiving the subscribed DNNs, the first PCF may determine, according to a carrier policy, that there is a usage limit on the UE in the first data network identified by the first DNN in the subscribed DNNs, and then determine that the usage of the UE in the first data network needs to be monitored.

Based on the implementation method, in an implementation, the subscription message in step 301c may include the subscribed DNNs. After receiving the subscribed DNNs, the usage monitoring network element determines that usage monitoring needs to be performed on the UE in the first data network. Alternatively, in another implementation, the subscription message in step 301c includes the first DNN, and does not include a DNN other than the first DNN in the subscribed DNNs.

Implementation method 2: The AMF determines a subscribed DNN, where the subscribed DNN includes the first DNN. Then, the AMF determines, according to a carrier policy, that there is a usage limit on the UE in the first data network identified by the first DNN, and then sends the first DNN and second indication information to the first PCF, where the second indication information indicates to monitor a usage status of the UE in the first data network.

Scenario 2: The identification information of the first network is the first DNN and the identification information of the first slice.

In the scenario 1, the first PCF further determines, according to the following implementation methods 3 and 4, and the like, that usage of the UE in the first DNN and usage of the UE in the first slice need to be monitored.

Implementation method 3: The AMF sends, to the first PCF, subscribed DNNs and identification information of slices that the UE is allowed to access, where the subscribed DNNs include the first DNN, and the identification information of the slices that the UE is allowed to access includes the identification information of the first slice. After receiving the subscribed DNNs and the identification information of the slices that the UE is allowed to access, the first PCF may determine, according to a carrier policy, that there is a usage limit on the UE in the first data network identified by the first DNN and a usage limit on the UE in the first slice, and then determine that the usage of the UE in the first data network and the usage of the UE in the first slice need to be monitored.

Based on the implementation method, in an implementation, the subscription message in step 301c may include the subscribed DNNs and the identification information of the slices that the UE is allowed to access. After receiving the subscribed DNNs and the identification information of the slices that the UE is allowed to access, the usage monitoring network element determines that usage monitoring needs to be performed on the UE in the first data network identified by the first DNN in the subscribed DNNs and the first slice in the slices accessed by the UE. Alternatively, in another implementation, the subscription message in step 301c includes the first DNN and the identification information of the first slice, does not include a DNN other than the first DNN in subscribed DNNs, and does not include identification information of a slice other than the identification information of the first slice in the identification information of the slices that the UE is allowed to access.

Implementation method 4: The AMF determines a subscribed DNN and identification information of a slice that the UE is allowed to access, where the subscribed DNN includes the first DNN, and the identification information of the slice that the UE is allowed to access includes the identification information of the first slice. Then, the AMF determines, according to a carrier policy, that there is a usage limit on the UE in the first data network identified by the first DNN and a usage limit on the UE in the first slice, and then sends the first DNN, the identification information of the first slice, and second indication information to the first PCF, where the second indication information indicates to monitor a usage status of the UE in the first data network and a usage status of the UE in the first slice.

Figure 5:
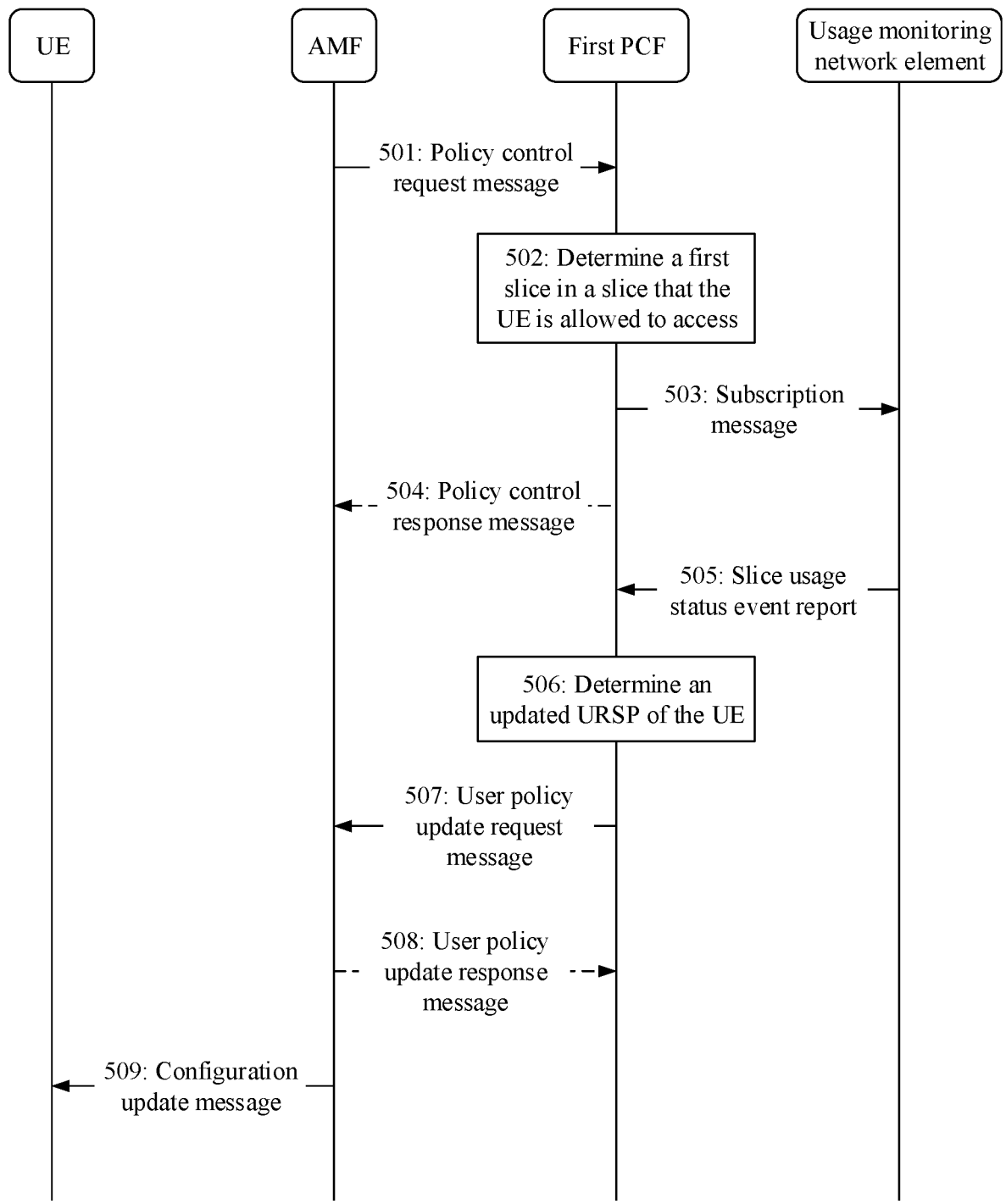
FIG. 5 is a schematic flowchart of another communication method according to this application.
Figure 6:
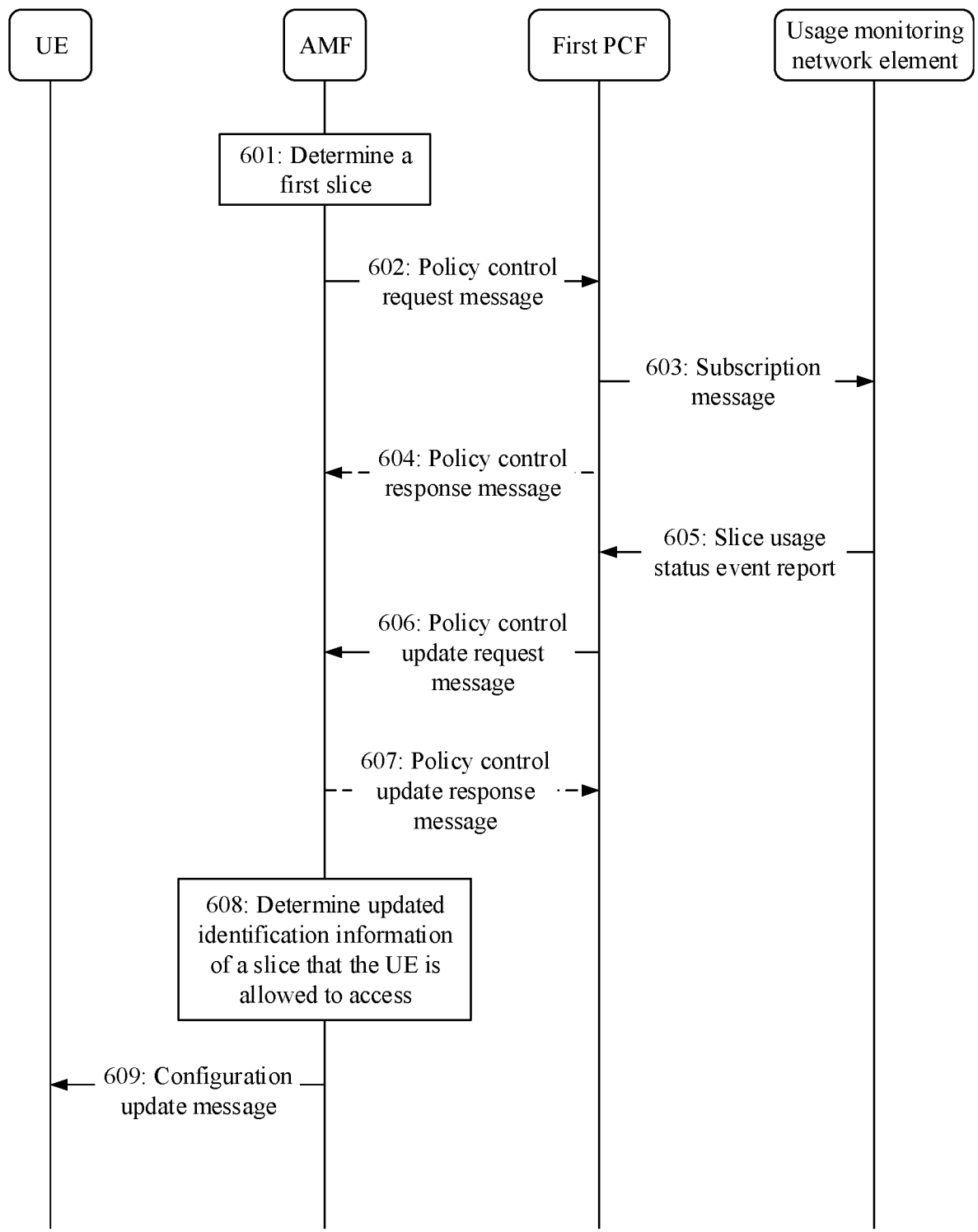
FIG. 6 is a schematic flowchart of another communication method according to this application.
Figure 7:
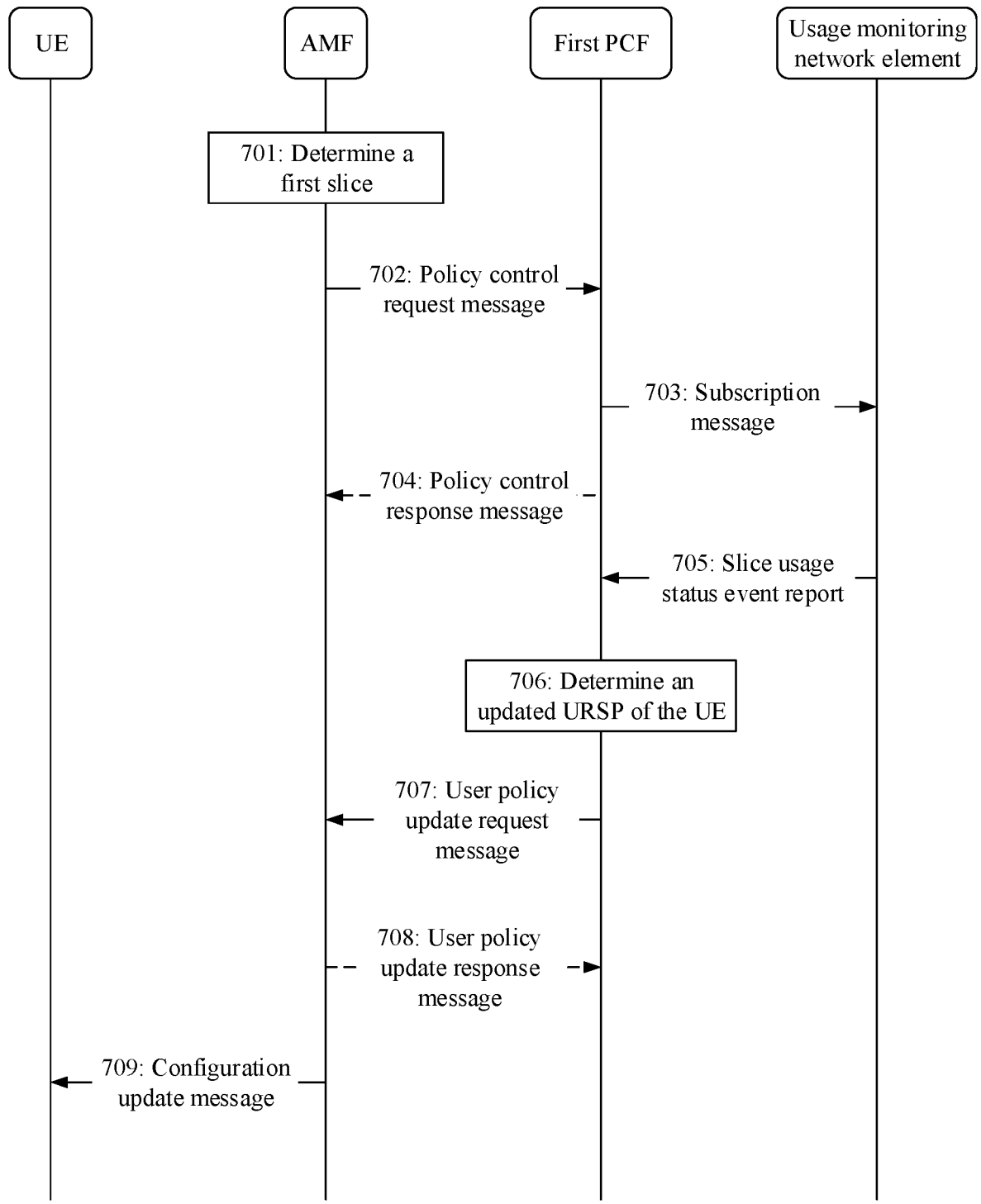
FIG. 7 is a schematic flowchart of another communication method according to this application.
Figure 8:
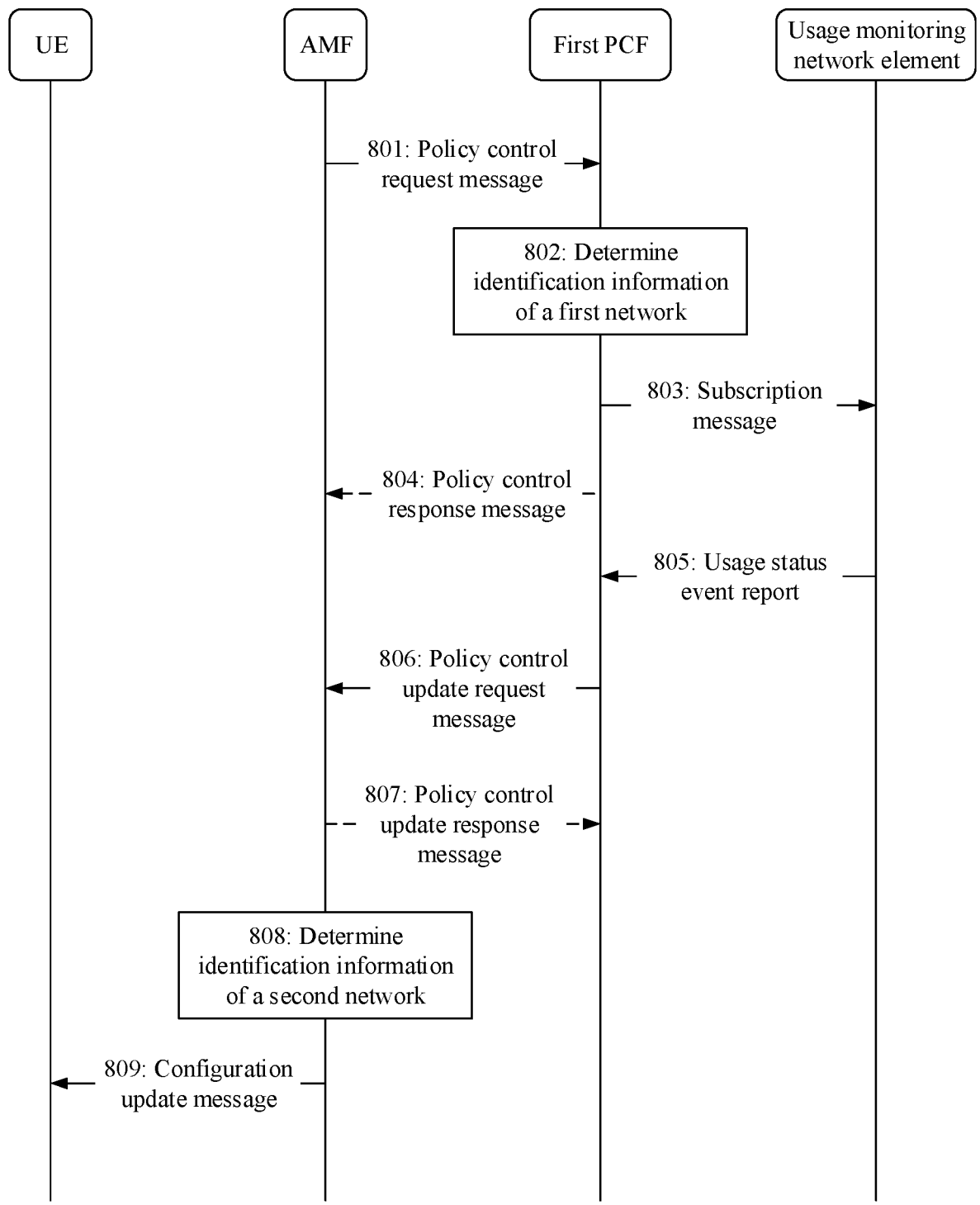
FIG. 8 is a schematic flowchart of another communication method according to this application.
Figure 9:
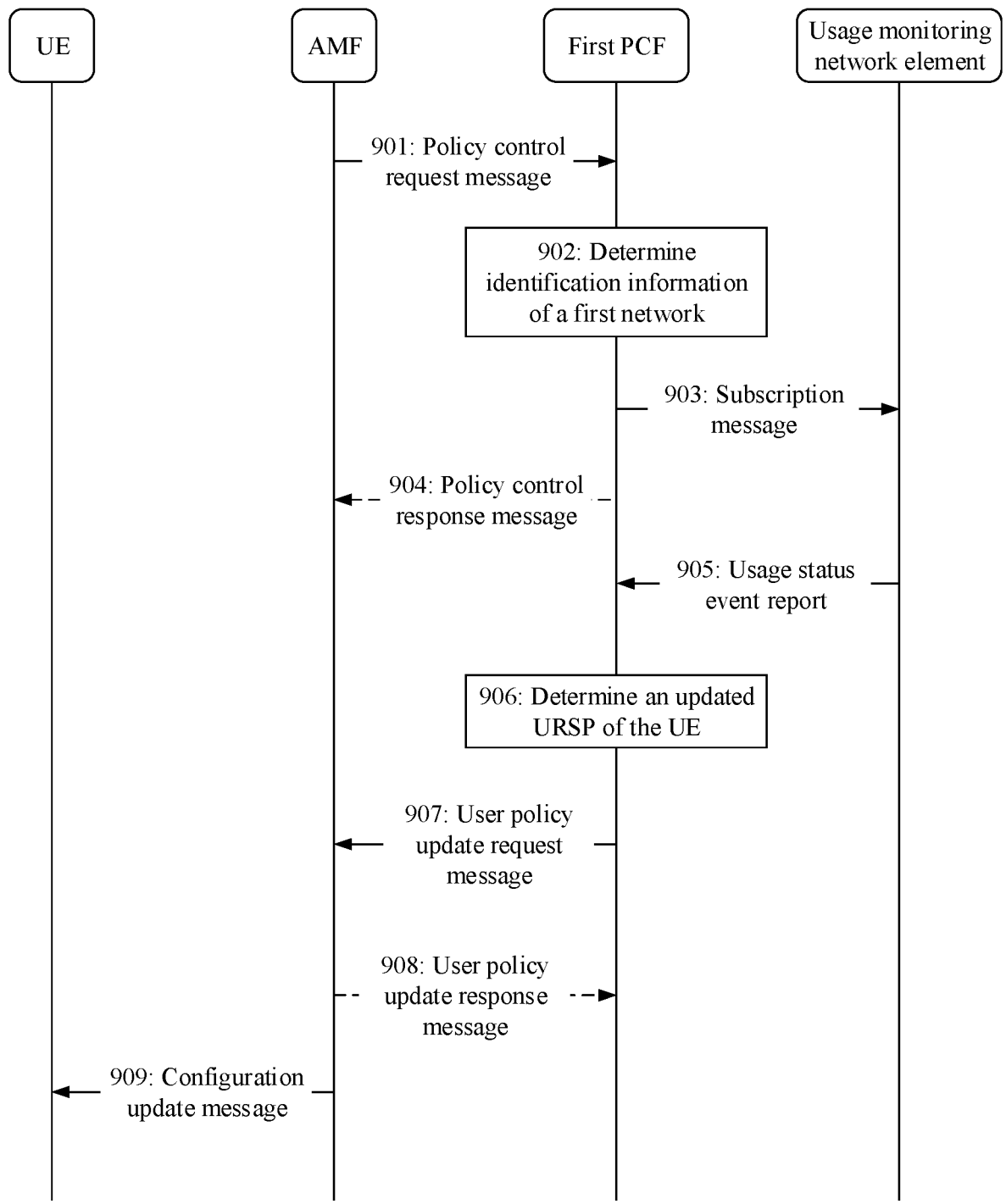
FIG. 9 is a schematic flowchart of another communication method according to this application.

The following describes the procedures shown in FIG. 3(a), FIG. 3(b), and FIG. 3(c) with reference to specific examples. In the following embodiments, embodiments corresponding to FIG. 4 and FIG. 5 are specific examples of the embodiment corresponding to FIG. 3(a), embodiments corresponding to FIG. 6 and FIG. 7 are specific examples of the embodiment corresponding to FIG. 3(b), and embodiments corresponding to FIG. 8 and FIG. 9 are specific examples of the embodiment corresponding to FIG. 3(c).

In embodiments of this application, a PCF to which the AMF is connected is referred to as a first PCF. The first PCF includes a UE PCF and an AMF PCF. That is, the first PCF has a function of providing a policy for a UE and a function of providing a policy for the AMF. A PCF to which an SMF is connected is referred to as a second PCF or an SM PCF.

Figure 4:
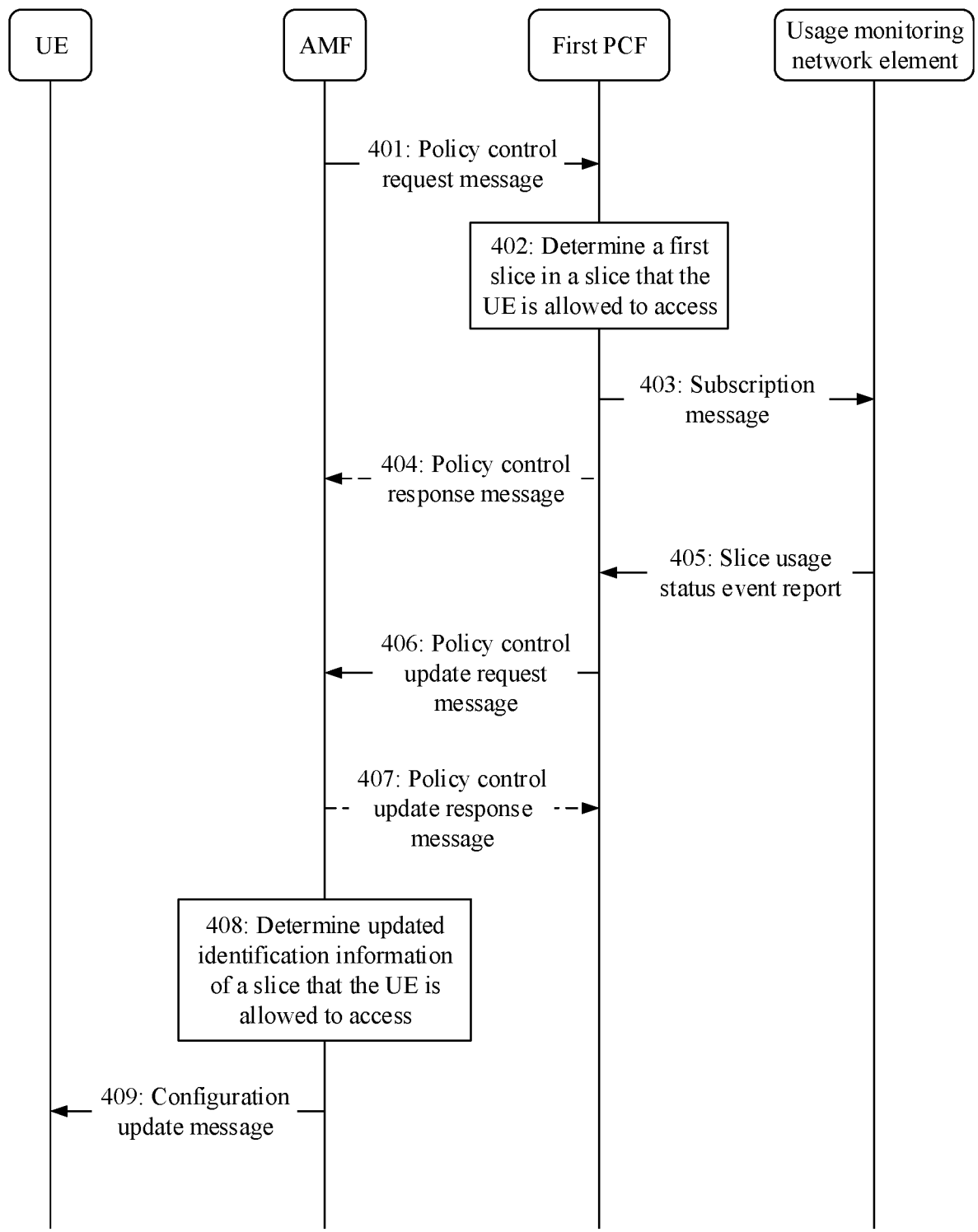
FIG. 4 is a schematic flowchart of another communication method according to this application.

FIG. 4 is a schematic flowchart of another communication method according to this application. The method may be applied to a handover procedure (for example, handover from 4G to 5G or handover from 5G to 5G), an initial registration procedure, or the like.

In this solution, a first PCF determines, based on allowed NSSAI from an AMF, a slice in which a usage status of a UE needs to be monitored, to adjust the allowed NSSAI of the UE in time when determining that a quota of the UE in a first slice is exhausted, and avoid an error caused because the UE is still guided to the first slice when the quota of the UE in the first slice is exhausted.

The method includes the following steps.

Step 401: The AMF sends a policy control request message to the first PCF. Correspondingly, the first PCF may receive the policy control request message.

The policy control request message carries identification information of a slice that the UE is allowed to access. For example, the identification information of the slice that the UE is allowed to access may be represented by the allowed NSSAI. The allowed NSSAI includes one or more pieces of S-NSSAI, and each piece of S-NSSAI identifies a slice that a network side decides to allow the UE to access. Therefore, the allowed NSSAI identifies one or more slices that the UE is allowed to access.

Step 402: The first PCF determines the first slice in the slice that the UE is allowed to access, where the first slice is a slice in which a usage status of the UE needs to be monitored.

That is, there is a quota limit on the UE in the first slice. For example, the quota of the UE is 20% of a total amount of the first slice.

In an implementation method, the first PCF may determine, according to a carrier policy, that there is a quota limit on usage of the UE in the first slice, and then determine that the usage status of the UE needs to be monitored in the first slice.

It should be noted that the first slice herein may be one or more slices.

Step 403: The first PCF sends a subscription message to a usage monitoring network element. Correspondingly, the usage monitoring network element may receive the subscription message.

The subscription message includes identification information (for example, an SUPI) of the UE and identification information of the first slice, and the subscription message is for subscribing to usage status information of the UE in the first slice. Optionally, the subscription message may further include a usage status event that indicates that a subscribed event is a usage status monitoring event.

The usage monitoring network element herein may be a second PCF (namely, an SM PCF), a UDR, or an NWDAF network element.

It should be noted that, if the first PCF and the second PCF are disposed on a same physical entity, the subscription message sent by the first PCF to the second PCF is an internal message. For example, a first PCF module sends the subscription message to a second PCF module through an internal interface, to request the usage status information.

Step 404: The first PCF sends a policy control response message to the AMF. Correspondingly, the AMF may receive the policy control response message.

The policy control response message includes an access and mobility management policy (AM Policy), for example, an RFSP index or a service area restriction.

Step 404 is an optional step.

Step 405: The usage monitoring network element sends a slice usage status event report to the first PCF. Correspondingly, the first PCF may receive the slice usage status event report.

The slice usage status event report includes the identification information of the first slice and indication information, where the indication information indicates that the usage of the UE in the first slice is exhausted, or the indication information indicates that the usage of the UE in the first slice reaches the quota.

In an implementation method, when the usage monitoring network element is the second PCF, the second PCF may determine, based on usage statistics performed by an SMF and a slice quota that is of the UE and that is from a UDR, that the usage of the UE in the first slice is exhausted.

Step 406: The first PCF sends a policy control update request message to the AMF based on the slice usage status event report. Correspondingly, the AMF may receive the policy control update request message.

The policy control update request message includes the identification information of the first slice and availability status information of the first slice, where the availability status information indicates that the first slice is unavailable.

Step 407: The AMF sends a policy control update response message to the first PCF. Correspondingly, the first PCF may receive the policy control update response message.

Step 407 is an optional step.

Step 408: The AMF determines updated identification information of a slice that the UE is allowed to access, where the updated identification information of the slice that the UE is allowed to access does not include the identification information of the first slice.

Step 409: The AMF sends a configuration update message to the UE. Correspondingly, the UE may receive the configuration update message.

The configuration update message includes the updated identification information of the slice that the UE is allowed to access.

After obtaining the updated identification information of the slice that the UE is allowed to access, the UE may initiate a session establishment procedure based on the updated identification information of the slice that the UE is allowed to access.

Based on the foregoing solution, the updated identification information of the slice that the UE is allowed to access does not include the identification information of the first slice, and the UE does not subsequently use a service of the first slice. Therefore, after usage of the UE in a slice is exhausted, the UE can be prevented from continuing to use a service of the slice. This helps implement correct communication.

In an alternative implementation, step 402 may alternatively be performed by the AMF before step 401. Specifically, the AMF first performs step 402, and then performs step 401. The policy control request message in step 401 carries identification information of the first slice and indication information instead of identification information of a slice that the UE is allowed to access, where the indication information indicates to monitor the usage status of the UE in the first slice. Subsequent steps are still performed in the sequence from step 403 to step 409.

In an implementation method, the policy control request message in step 401 is an Npcf_AMPolicyControl_Create Request message, the policy control response message in step 404 is an Npcf_AMPolicyControl_Create Response message, the policy control update request message in step 406 is an Npcf_AMPolicyControl_UpdateNotify Request message, and the policy control update response message in step 407 is an Npcf_AMPolicyControl_UpdateNotify Response message.

In another implementation method, the policy control request message in step 401 is an Npcf_AMPolicyControl_Update Request message, the policy control response message in step 404 is an Npcf_AMPolicyControl_Update Response message, the policy control update request message in step 406 is an Npcf_AMPolicyControl_UpdateNotify Request message, and the policy control update response message in step 407 is an Npcf_AMPolicyControl_UpdateNotify Response message.

In another implementation method, the policy control request message in step 401 is an Npcf_UEPolicyControl_Create Request message, the policy control response message in step 404 is an Npcf_UEPolicyControl_Create Response message, the policy control update request message in step 406 is an Npcf_UEPolicyControl_UpdateNotify Request message, and the policy control update response message in step 407 is an Npcf_UEPolicyControl_UpdateNotify Response message.

In another implementation method, the policy control request message in step 401 is an Npcf_UEPolicyControl_Update Request message, the policy control response message in step 404 is an Npcf_UEPolicyControl_Update Response message, the policy control update request message in step 406 is an Npcf_UEPolicyControl_UpdateNotify Request message, and the policy control update response message in step 407 is an Npcf_UEPolicyControl_UpdateNotify Response message.

FIG. 5 is a schematic flowchart of another communication method according to this application. The method may be applied to a handover procedure (for example, handover from 4G to 5G or handover from 5G to 5G), an initial registration procedure, or the like.

In this solution, a first PCF determines, based on allowed NSSAI from an AMF, a first slice in which a usage status of a UE needs to be monitored, to adjust the allowed NSSAI of the UE in time when determining that a quota of the UE in the first slice is exhausted, and avoid an error caused because the UE is still guided to the first slice when the quota of the UE in the first slice is exhausted. In the method, a URSP policy is updated to prevent the UE from initiating a service request in a slice whose usage is exhausted.

The method includes the following steps.

Step 501 to step 505 are the same as step 401 to step 405 in the embodiment in FIG. 4. Refer to the foregoing descriptions.

Step 506: The first PCF determines an updated URSP of the UE, where the URSP does not include the identification information of the first slice.

Specifically, based on the foregoing descriptions, a URSP includes one or more RSDs, and each RSD includes information such as S-NSSAI, a DNN, and an SSC mode. In this embodiment of this application, the URSP may be updated, so that each RSD in the updated URSP does not include the identification information of the first slice. Therefore, the UE cannot find, through matching, an RSD including the identification information of the first slice. Consequently, the UE cannot use the first slice.

Step 507: The first PCF sends a user policy update request message to the AMF. Correspondingly, the AMF may receive the user policy update request message.

The user policy update message includes the updated URSP.

Step 508: The AMF sends a user policy update response message to the first PCF. Correspondingly, the first PCF may receive the user policy update response message.

Step 508 is an optional step.

Step 509: The AMF sends a configuration update message to the UE. Correspondingly, the UE may receive the configuration update message.

The configuration update message includes the updated URSP.

Based on the foregoing solution, the updated URSP does not include the identification information of the first slice, and the UE does not subsequently use a service of the first slice. Therefore, after usage of the UE in a slice is exhausted, the UE can be prevented from continuing to use a service of the slice. This helps implement correct communication.

In an alternative implementation, step 502 may alternatively be performed by the AMF before step 501. Specifically, the AMF first performs step 502, and then performs step 501. The policy control request message in step 501 carries identification information of the first slice and indication information instead of identification information of a slice that the UE is allowed to access, where the indication information indicates to monitor the usage status of the UE in the first slice. Subsequent steps are still performed in the sequence from step 503 to step 509.

In an implementation method, the user policy update request message in step 507 is an Namf_N1N2MessageTransfer Request message, and the user policy update response message in step 508 is an Namf_N1N2MessageTransfer Response message.

FIG. 6 is a schematic flowchart of another communication method according to this application. The method may be applied to a handover procedure (for example, handover from 4G to 5G or handover from 5G to 5G), an initial registration procedure, or the like.

In this solution, an AMF determines a slice in which a usage status needs to be monitored and that is in a slice subscribed to by a tenant, and then sends information about the slice to a first PCF, so that the first PCF notifies the AMF of a quota exhaustion event in time when determining that a quota of the slice is exhausted, to trigger the AMF to adjust allowed NSSAI of a UE served by the slice, and avoid an error caused because the slice still serves, when the quota of the slice is exhausted, a UE allowed to access the slice.

The method includes the following steps.

Step 601: The AMF determines a first slice, where the first slice is a slice in which a usage status needs to be monitored and that is in a slice supported by the AMF.

That is, there is a quota limit on the first slice. Optionally, a quota of the first slice includes a traffic quota and/or a duration quota. For example, the traffic quota of the first slice is 100 megabytes, and the duration quota of the first slice is one hour.

In an implementation method, the AMF may determine, according to a carrier policy, that there is a quota limit on usage of the first slice in the slice supported by the AMF, and then determine that the usage status needs to be monitored in the first slice.

It should be noted that the first slice herein may be one or more slices.

Step 602: The AMF sends a policy control request message to the first PCF. Correspondingly, the first PCF may receive the policy control request message.

The policy control request message carries identification information of the first slice and indication information, and the indication information indicates to monitor usage status information of the first slice.

Step 603: The first PCF sends a subscription message to a usage monitoring network element. Correspondingly, the usage monitoring network element may receive the subscription message.

The subscription message includes the identification information of the first slice, and the subscription message is for subscribing to the usage status information of the first slice. Optionally, the subscription message may further include a usage status event that indicates that a subscribed event is a usage status monitoring event.

The usage monitoring network element herein may be a UDR or an NWDAF network element.

Step 604: The first PCF sends a policy control response message to the AMF. Correspondingly, the AMF may receive the policy control response message.

The policy control response message includes an access and mobility management policy (AM Policy), for example, an RFSP index or a service area restriction.

Step 604 is an optional step.

Step 605: The usage monitoring network element sends a slice usage status event report to the first PCF. Correspondingly, the first PCF may receive the slice usage status event report.

The slice usage status event report includes the identification information of the first slice and indication information, where the indication information indicates that the usage of the first slice is exhausted, or the indication information indicates that the usage of the first slice reaches the quota.

Step 606: The first PCF sends a policy control update request message to the AMF based on the slice usage status event report. Correspondingly, the AMF may receive the policy control update request message.

The policy control update request message includes the identification information of the first slice and availability status information of the first slice, where the availability status information indicates that the first slice is unavailable.

Step 607: The AMF sends a policy control update response message to the first PCF. Correspondingly, the first PCF may receive the policy control update response message.

Step 607 is an optional step.

Step 608: The AMF determines updated identification information of a slice that the UE is allowed to access, where the updated identification information of the slice that the UE is allowed to access does not include the identification information of the first slice. The UE herein is a UE allowed to use a service of the first slice. Allowed NSSAI that is not updated and that is received by the UE or subscribed NSSAI includes the first slice. The UE is also referred to as a UE served by the first slice.

The updated identification information of the slice that the UE is allowed to access in step 608 may be represented by new allowed NSSAI (that is, updated allowed NSSAI).

Step 609: The AMF sends a configuration update message to the UE. Correspondingly, the UE may receive the configuration update message.

The configuration update message includes the updated identification information of the slice that the UE is allowed to access.

After obtaining the updated identification information of the slice that the UE is allowed to access, the UE may initiate a session establishment procedure based on the updated identification information of the slice that the UE is allowed to access.

Based on the foregoing solution, the updated identification information of the slice that the UE is allowed to access does not include the identification information of the first slice, and the UE does not subsequently use the service of the first slice. Therefore, after usage of a slice is exhausted, a UE served by the slice can be prevented from continuing to use a service of the slice. This helps implement correct communication.

In an implementation method, the policy control request message in step 602 is an Npcf_AMPolicyControl_Create Request message, the policy control response message in step 604 is an Npcf_AMPolicyControl_Create Response message, the policy control update request message in step 606 is an Npcf_AMPolicyControl_UpdateNotify Request message, and the policy control update response message in step 607 is an Npcf_AMPolicyControl_UpdateNotify Response message.

In another implementation method, the policy control request message in step 602 is an Npcf_AMPolicyControl_Update Request message, the policy control response message in step 604 is an Npcf_AMPolicyControl_Update Response message, the policy control update request message in step 606 is an Npcf_AMPolicyControl_UpdateNotify Request message, and the policy control update response message in step 607 is an Npcf_AMPolicyControl_UpdateNotify Response message.

In another implementation method, the policy control request message in step 602 is an Npcf_UEPolicyControl_Create Request message, the policy control response message in step 604 is an Npcf_UEPolicyControl_Create Response message, the policy control update request message in step 606 is an Npcf_UEPolicyControl_UpdateNotify Request message, and the policy control update response message in step 607 is an Npcf_UEPolicyControl_UpdateNotify Response message.

In another implementation method, the policy control request message in step 602 is an Npcf_UEPolicyControl_Update Request message, the policy control response message in step 604 is an Npcf_UEPolicyControl_Update Response message, the policy control update request message in step 606 is an Npcf_UEPolicyControl_UpdateNotify Request message, and the policy control update response message in step 607 is an Npcf_UEPolicyControl_UpdateNotify Response message.

FIG. 7 is a schematic flowchart of another communication method according to this application. The method may be applied to a handover procedure (for example, handover from 4G to 5G or handover from 5G to 5G), an initial registration procedure, or the like.

In this solution, an AMF determines a slice in which a usage status needs to be monitored and that is in a slice subscribed to by a tenant, and then sends information about the slice to a first PCF, so that the first PCF adjusts, in time when determining a quota of the slice is exhausted, a URSP of a UE served by the slice, to avoid an error caused because the slice still serves the UE served by the slice when the quota of the slice is exhausted. In the method, a URSP policy is updated to prevent a UE from initiating a service request in a slice whose usage is exhausted.

The method includes the following steps.

Step 701 to step 705 are the same as step 601 to step 605 in the embodiment in FIG. 6. Refer to the foregoing descriptions.

Step 706: The first PCF determines an updated URSP of the UE, where the URSP does not include the identification information of the first slice.

The UE herein is a UE allowed to use a service of the first slice. For example, allowed NSSAI received by the UE or subscribed NSSAI includes the first slice. The UE is also referred to as a UE served by the first slice.

Specifically, based on the foregoing descriptions, a URSP includes one or more RSDs, and each RSD includes information such as S-NSSAI, a DNN, and an SSC mode. In this embodiment of this application, the URSP may be updated, so that each RSD in the updated URSP does not include the identification information of the first slice. Therefore, the UE cannot find, through matching, an RSD including identification information of the first slice. Consequently, the UE cannot use the first slice.

Step 707: The first PCF sends a user policy update request message to the AMF. Correspondingly, the AMF may receive the user policy update request message.

The user policy update request message includes the updated URSP.

Step 708: The AMF sends a user policy update response message to the first PCF. Correspondingly, the first PCF may receive the user policy update response message.

Step 708 is an optional step.

Step 709: The AMF sends a configuration update message to the UE. Correspondingly, the UE may receive the configuration update message.

The UE herein is a UE that uses the service of the first slice, and is also referred to as the UE served by the first slice.

The configuration update message includes the updated URSP.

Based on the foregoing solution, the updated URSP does not include the identification information of the first slice, and the UE does not subsequently use the service of the first slice. Therefore, after usage of a slice is exhausted, a UE allowed to access the slice can be prevented from continuing to use a service of the slice. This helps implement correct communication.

In an implementation method, the user policy update request message in step 707 is an Namf_N1N2MessageTransfer Request message, and the user policy update response message in step 708 is an Namf_N1N2MessageTransfer Response message.

FIG. 8 is a schematic flowchart of another communication method according to this application. The method may be applied to a handover procedure (for example, handover from 4G to 5G or handover from 5G to 5G), an initial registration procedure, or the like.

In this solution, a first PCF determines a network in which a usage status of a UE needs to be monitored, to avoid an error caused because the UE is still guided to a first network when determining that a quota of the UE in the first network is exhausted.

The method includes the following steps.

Step 801: An AMF sends a policy control request message to the first PCF. Correspondingly, the first PCF may receive the policy control request message.

In an implementation method, the policy control request message carries a subscribed DNN, where the subscribed DNN includes one or more DNNs to which the UE subscribes.

In another implementation method, the policy control request message carries a subscribed DNN and identification information of a slice that the UE is allowed to access, where the subscribed DNN includes one or more DNNs to which the UE subscribes, and the identification information of the slice that the UE is allowed to access may be represented by allowed NSSAI. The allowed NSSAI includes one or more pieces of S-NSSAI, and each piece of S-NSSAI identifies a slice that a network side decides to allow the UE to access. Therefore, the allowed NSSAI identifies one or more slices that the UE is allowed to access.

Step 802: The first PCF determines identification information of the first network, where the first network is a network in which a usage status of the UE needs to be monitored.

In an implementation method, if the policy control request message carries the subscribed DNN, the identification information that is of the first network and that is determined by the first PCF in step 802 is a first DNN in the subscribed DNN.

In an implementation method, if the policy control request message carries the subscribed DNN and the identification information of the slice that the UE is allowed to access, the identification information that is of the first network and that is determined by the first PCF in step 802 is a first DNN in the subscribed DNN and identification information of a first slice in the identification information of the slice that the UE is allowed to access. In other words, the identification information of the first network is the first DNN and the identification information of the first slice.

That is, there is a quota limit on the UE in the first network. For example, the quota of the UE is 20% of a total amount of the first network.

In an implementation method, the first PCF may determine, according to a carrier policy, that there is a quota limit on usage of the UE in the first network, and then determine that the usage status of the UE needs to be monitored in the first network.

It should be noted that the first network herein may be one or more networks.

Step 803: The first PCF sends a subscription message to a usage monitoring network element. Correspondingly, the usage monitoring network element may receive the subscription message.

The subscription message includes identification information (for example, an SUPI) of the UE and the identification information of the first network, and the subscription message is for subscribing to usage status information of the UE in the first network. Optionally, the subscription message may further include a usage status event that indicates that a subscribed event is a usage status monitoring event.

The usage monitoring network element herein may be a second PCF (namely, an SM PCF), a UDR, or an NWDAF network element.

It should be noted that, if the first PCF and the second PCF are disposed on a same physical entity, the subscription message sent by the first PCF to the second PCF is an internal message. For example, a first PCF module sends the subscription message to a second PCF module through an internal interface, to request the usage status information.

Step 804: The first PCF sends a policy control response message to the AMF. Correspondingly, the AMF may receive the policy control response message.

The policy control response message includes an access and mobility management policy (AM Policy), for example, an RFSP index or a service area restriction.

Step 804 is an optional step.

Step 805: The usage monitoring network element sends a usage status event report to the first PCF. Correspondingly, the first PCF may receive the usage status event report.

The usage status event report includes the identification information of the first network and indication information, where the indication information indicates that the usage of the UE in the first network is exhausted, or the indication information indicates that the usage of the UE in the first network reaches the quota.

In an implementation method, when the usage monitoring network element is the second PCF, the second PCF may determine, based on usage statistics performed by an SMF and a network quota that is of the UE and that is from a UDR, that the usage of the UE in the first network is exhausted.

Step 806: The first PCF sends a policy control update request message to the AMF based on the usage status event report. Correspondingly, the AMF may receive the policy control update request message.

The policy control update request message includes the identification information of the first network and availability status information of the first network, where the availability status information indicates that the first network is unavailable.

Step 807: The AMF sends a policy control update response message to the first PCF. Correspondingly, the first PCF may receive the policy control update response message.

Step 807 is an optional step.

Step 808: The AMF determines identification information of a second network, where the identification information of the second network does not include the identification information of the first network.

The identification information of the second network may alternatively be understood as identification information of a network that the UE is allowed to access.

Step 809: The AMF sends a configuration update message to the UE. Correspondingly, the UE may receive the configuration update message.

The configuration update message includes the identification information of the second network.

After obtaining the identification information of the second network, the UE may initiate a session establishment procedure based on the identification information of the second network.

Based on the foregoing solution, the identification information of the second network does not include the identification information of the first network, and the UE does not subsequently use a service of the first network. Therefore, after usage of the UE in a network is exhausted, the UE can be prevented from continuing to use a service of the network. This helps implement correct communication.

In an alternative implementation, step 802 may alternatively be performed by the AMF before step 801. Specifically, the AMF first performs step 802, and then performs step 801. The policy control request message in step 801 carries the identification information of the first network and indication information instead of a subscribed DNN or the subscribed DNN and identification information of a slice that the UE is allowed to access, where the indication information indicates to monitor the usage status of the UE in the first network. Subsequent steps are still performed in the sequence from step 803 to step 809.

In an implementation method, the policy control request message in step 801 is an Npcf_AMPolicyControl_Create Request message, the policy control response message in step 804 is an Npcf_AMPolicyControl_Create Response message, the policy control update request message in step 806 is an Npcf_AMPolicyControl_UpdateNotify Request message, and the policy control update response message in step 807 is an Npcf_AMPolicyControl_UpdateNotify Response message.

In another implementation method, the policy control request message in step 801 is an Npcf_AMPolicyControl_Update Request message, the policy control response message in step 804 is an Npcf_AMPolicyControl_Update Response message, the policy control update request message in step 806 is an Npcf_AMPolicyControl_UpdateNotify Request message, and the policy control update response message in step 807 is an Npcf_AMPolicyControl_UpdateNotify Response message.

In another implementation method, the policy control request message in step 801 is an Npcf_UEPolicyControl_Create Request message, the policy control response message in step 804 is an Npcf_UEPolicyControl_Create Response message, the policy control update request message in step 806 is an Npcf_UEPolicy-Control_UpdateNotify Request message, and the policy control update response message in step 807 is an Npcf_UEPolicyControl_UpdateNotify Response message.

In another implementation method, the policy control request message in step 801 is an Npcf_UEPolicyControl_Update Request message, the policy control response message in step 804 is an Npcf_UEPolicyControl_Update Response message, the policy control update request message in step 806 is an Npcf_UEPolicyControl_UpdateNotify Request message, and the policy control update response message in step 807 is an Npcf_UEPolicyControl_UpdateNotify Response message.

FIG. 9 is a schematic flowchart of another communication method according to this application. The method may be applied to a handover procedure (for example, handover from 4G to 5G or handover from 5G to 5G), an initial registration procedure, or the like.

In this solution, a first PCF determines a first network in which a usage status of a UE needs to be monitored, to avoid an error caused because the UE is still guided to the first network when determining that a quota of the UE in the first network is exhausted. In the method, a URSP policy is updated to prevent the UE from initiating a service request in a network whose usage is exhausted.

The method includes the following steps.

Step 901 to step 905 are the same as step 801 to step 805 in the embodiment in FIG. 8. Refer to the foregoing descriptions.

Step 906: The first PCF determines an updated URSP of the UE, where the URSP does not include the identification information of the first network.

Specifically, based on the foregoing descriptions, a URSP includes one or more RSDs, and each RSD includes information such as S-NSSAI, a DNN, and an SSC mode. In this embodiment of this application, the URSP may be updated, so that each RSD in the updated URSP does not include the identification information of the first network. Therefore, the UE cannot find, through matching, an RSD including the identification information of the first network. Consequently, the UE cannot use the first network.

Step 907: The first PCF sends a user policy update request message to the AMF. Correspondingly, the AMF may receive the user policy update request message.

The policy control update message includes the updated URSP.

Step 908: The AMF sends a user policy update response message to the first PCF. Correspondingly, the first PCF may receive the user policy update response message.

Step 908 is an optional step.

Step 909: The AMF sends a configuration update message to the UE. Correspondingly, the UE may receive the configuration update message.

The configuration update message includes the updated URSP.

Based on the foregoing solution, the updated URSP does not include the identification information of the first network, and the UE does not subsequently use a service of the first network. Therefore, after usage of the UE in a network is exhausted, the UE can be prevented from continuing to use a service of the network. This helps implement correct communication.

In an alternative implementation, step 902 may alternatively be performed by the AMF before step 901. Specifically, the AMF first performs step 902, and then performs step 901. The policy control request message in step 901 carries the identification information of the first network and indication information instead of a subscribed DNN or the subscribed DNN and identification information of a slice that the UE is allowed to access, where the indication information indicates to monitor the usage status of the UE in the first network. Subsequent steps are still performed in the sequence from step 903 to step 909.

In an implementation method, the user policy update request message in step 907 is an Namf_N1N2MessageTransfer Request message, and the user policy update response message in step 908 is an Namf_N1N2MessageTransfer Response message.

In the embodiments shown in FIG. 3(*a*) to FIG. 3(*c*) and FIG. 4 to FIG. 9, the first PCF sends the subscription message to the usage monitoring network element, to trigger the usage monitoring network element to monitor the usage of the UE in the first slice, the usage of the first slice, or the usage of the UE in the first network. Further, when detecting that the usage of the UE in the first slice, the usage of the first slice, or the usage of the UE in the first network is exhausted, the usage monitoring network element sends the first indication information to the first PCF. In another implementation method, in the embodiments shown in FIG. 3(*a*) to FIG. 3(*c*) and FIG. 4 to FIG. 9, the identification information of the UE and the identification information of the first slice (or the identification information of the first network) may alternatively be obtained by the usage monitoring network element, for example, from the SMF or another network element. Then, the usage monitoring network element determines that the usage of the UE in the first slice, the usage of the first slice, or the usage of the UE in the first network is exhausted, and then sends the first indication information to the first PCF, where the first indication information indicates that the usage of the UE in the first slice, the usage of the first slice, or the usage of the UE in the first network is exhausted.

The solutions provided in this application are described above mainly from a perspective of interaction between network elements. It may be understood that, to implement the foregoing functions, each network element includes a corresponding hardware structure and/or software module for implementing each function. A person skilled in the art should be easily aware that, in combination with the examples described in embodiments disclosed in this specification, units, algorithms, and steps can be implemented by hardware or a combination of hardware and computer software in the present application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

It may be understood that in the foregoing method embodiments, corresponding steps or operations implemented by the first policy control network element may alternatively be implemented by a component (for example, a chip or a circuit) configured in the first policy control network element, corresponding steps or operations implemented by the usage monitoring network element may alternatively be implemented by a component (for example, a chip or a circuit) configured in the usage monitoring network element, and corresponding steps or operations implemented by the mobility management network element may alternatively be implemented by a component (for example, a chip or a circuit) configured in the mobility management network element.

Figure 10:
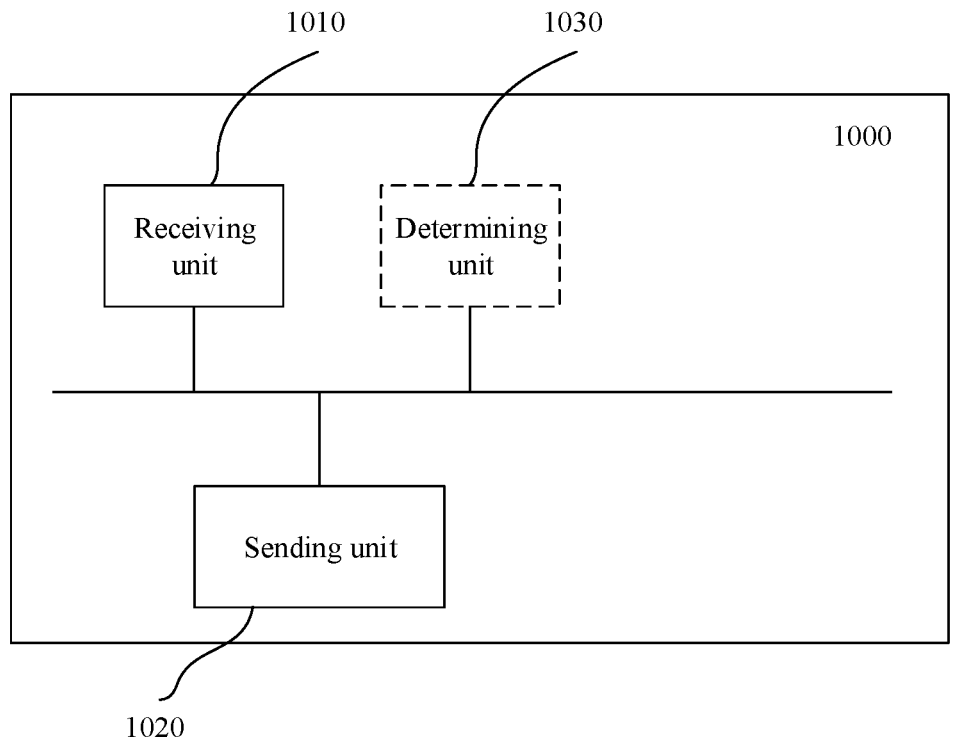
FIG. 10 is a schematic diagram of a communication apparatus according to this application.

FIG. 10 is a schematic diagram of a communication apparatus according to an embodiment of this application. The apparatus is configured to implement corresponding steps performed by the first policy control network element or the mobility management network element in the foregoing method embodiments. As shown in FIG. 10, the apparatus 1000 includes a receiving unit 1010 and a sending unit 1020. Optionally, the apparatus 1000 further includes a determining unit 1030.

In a first embodiment, the communication apparatus is configured to implement corresponding steps performed by the first policy control network element in the foregoing method embodiments.

The sending unit 1020 is configured to: send a subscription message to a usage monitoring network element, where the subscription message includes identification information of a first slice and identification information of a terminal device, and the subscription message is for subscribing to usage status information of the terminal device in the first slice; and send availability status information of the first slice to a mobility management network element, where the availability status information indicates that the first slice is unavailable; or send a user route selection policy to the terminal device, where the user route selection policy does not include the identification information of the first slice. The receiving unit 1010 is configured to receive first indication information from the usage monitoring network element, where the first indication information indicates that usage of the terminal device in the first slice is exhausted.

In a possible implementation method, the receiving unit 1010 is further configured to: before the sending unit 1020 sends the subscription message to the usage monitoring network element, receive, from the mobility management network element, identification information of a slice that the terminal device is allowed to access, where the slice that the terminal device is allowed to access includes the first slice.

In a possible implementation method, the determining unit 1030 is configured to determine the first slice in the slice that the terminal device is allowed to access.

In a possible implementation method, the receiving unit 1010 is further configured to: before the sending unit 1020 sends the subscription message to the usage monitoring network element, receive the identification information of the first slice and second indication information from the mobility management network element, where the second indication information indicates to monitor a usage status of the terminal device in the first slice.

In a possible implementation method, that the receiving unit 1010 is configured to receive the first indication information from the usage monitoring network element specifically includes: being configured to receive a slice usage status event report from the usage monitoring network element, where the slice usage status event report includes the identification information of the first slice and the first indication information.

In a possible implementation method, the usage monitoring network element is a policy control network element, and the policy control network element serves a session management network element; the usage monitoring network element is a unified data repository; or the usage monitoring network element is a network data analysis network element.

In a second embodiment, the communication apparatus is configured to implement corresponding steps performed by the first policy control network element in the foregoing method embodiments.

The sending unit 1020 is configured to: send a subscription message to a usage monitoring network element, where the subscription message includes identification information of a first slice, and the subscription message is for subscribing to usage status information of the first slice; and send availability status information of the first slice to a mobility management network element, where the availability status information indicates that the first slice is unavailable; or send, by the first policy control network element, a user route selection policy to a terminal device allowed to access the first slice, where the user route selection policy does not include the identification information of the first slice. The receiving unit 1010 is configured to receive first indication information from the usage monitoring network element, where the first indication information indicates that usage of the first slice is exhausted.

In a possible implementation method, the receiving unit 1010 is further configured to: before the sending unit 1020 sends the subscription message to the usage monitoring network element, receive the identification information of the first slice and second indication information from the mobility management network element, where the second indication information indicates to monitor a usage status of the first slice.

In a possible implementation method, that the receiving unit 1010 is configured to receive the first indication information from the usage monitoring network element specifically includes: receiving a slice usage status event report from the usage monitoring network element, where the slice usage status event report includes the identification information of the first slice and the first indication information.

In a possible implementation method, the usage monitoring network element is a policy control network element, and the policy control network element serves a session management network element; the usage monitoring network element is a unified data repository; or the usage monitoring network element is a network data analysis network element.

In a third embodiment, the communication apparatus is configured to implement corresponding steps performed by the mobility management network element in the foregoing method embodiments.

The receiving unit 1010 is configured to receive availability status information of a first slice from a policy control network element, where the availability status information indicates that the first slice is unavailable, and the availability status information is sent when usage of a terminal device in the first slice is exhausted. The sending unit 1020 is configured to send, to the terminal device, identification information of a slice that the terminal device is allowed to access, where the identification information of the slice that the terminal device is allowed to access does not include identification information of the first slice.

In a possible implementation method, the sending unit 1020 is further configured to: before the receiving unit receives the availability status information of the first slice from the policy control network element, send, to the policy control network element, the identification information of the slice that the terminal device is allowed to access, where the slice that the terminal device is allowed to access includes the first slice. Alternatively, the determining unit 1030 is configured to determine the first slice in the slice that the terminal device is allowed to access. The sending unit 1020 is further configured to send the identification information of the first slice and indication information to the policy control network element, where the indication information indicates to monitor a usage status of the terminal device in the first slice.

In a fourth embodiment, the communication apparatus is configured to implement corresponding steps performed by the mobility management network element in the foregoing method embodiments.

The receiving unit 1010 is configured to receive availability status information of a first slice from a policy control network element, where the availability status information indicates that the first slice is unavailable, and the availability status information is sent when usage of the first slice is exhausted. The sending unit 1020 is configured to send, to a terminal device allowed to access the first slice, updated identification information of a slice that the terminal device is allowed to access, where the updated identification information of the slice that the terminal device is allowed to access does not include identification information of the first slice.

In a possible implementation method, the determining unit 1030 is configured to: before the receiving unit receives the availability status information of the first slice from the policy control network element, determine the first slice in a slice supported by the mobility management network element. The sending unit 1020 is further configured to send the identification information of the first slice and indication information to the policy control network element, where the indication information indicates to monitor a usage status of the first slice.

In a fifth embodiment, the communication apparatus is configured to implement corresponding steps performed by the first policy control network element in the foregoing method embodiments.

The sending unit 1020 is configured to: send a subscription message to a usage monitoring network element, where the subscription message includes identification information of a first network and identification information of a terminal device, and the subscription message is for subscribing to usage status information of the terminal device in the first network; and send availability status information of the first network to a mobility management network element, where the availability status information indicates that the first network is unavailable; or send a user route selection policy to the terminal device, where the user route selection policy does not include the identification information of the first network. The receiving unit 1010 is configured to receive first indication information from the usage monitoring network element, where the first indication information indicates that usage of the terminal device in the first network is exhausted.

In a possible implementation method, the identification information of the first network is a first data network name DNN, the first DNN identifies a first data network, the subscription message is for subscribing to usage status information of the terminal device in the first data network, and the first indication information indicates that usage of the terminal device in the first data network is exhausted.

In a possible implementation method, the receiving unit 1010 is configured to: before the sending unit 1020 sends the subscription message to the usage monitoring network element, receive a subscribed DNN from the mobility management network element, where the subscribed DNN includes the first DNN.

In a possible implementation method, the determining unit 1030 is configured to determine the first DNN in the subscribed DNN.

In a possible implementation method, the receiving unit 1010 is configured to: before the sending unit 1020 sends the subscription message to the usage monitoring network element, receive the first DNN and second indication information from the mobility management network element, where the second indication information indicates to monitor a usage status of the terminal device in the first data network.

In a possible implementation method, that the receiving unit 1010 is configured to receive first indication information from the usage monitoring network element specifically includes: being configured to receive a usage status event report from the usage monitoring network element, where the usage status event report includes the first DNN and the first indication information.

In a possible implementation method, the identification information of the first network is a first data network name DNN and identification information of a first slice, the first DNN identifies a first data network, the identification information of the first slice identifies the first slice, the subscription message is for subscribing to usage status information of the terminal device in the first data network and usage status information of the terminal device in the first slice, and the first indication information indicates that usage of the terminal device in the first data network and usage of the terminal device in the first slice are exhausted.

In a possible implementation method, the receiving unit 1010 is configured to: before the sending unit 1020 sends the subscription message to the usage monitoring network element, receive, from the mobility management network element, a subscribed DNN and identification information of a slice that the terminal device is allowed to access, where the subscribed DNN includes the first DNN, and the slice that the terminal device is allowed to access includes the first slice.

In a possible implementation method, the determining unit 1030 is configured to determine the first DNN in the subscribed DNN and the first slice in the slice that the terminal device is allowed to access.

In a possible implementation method, the receiving unit 1010 is configured to: before the sending unit 1020 sends the subscription message to the usage monitoring network element, receive the first DNN, identification information of the first slice, and second indication information from the mobility management network element, where the second indication information indicates to monitor a usage status of the terminal device in the first data network and a usage status of the terminal device in the first slice.

In a possible implementation method, that the receiving unit 1010 is configured to receive first indication information from the usage monitoring network element specifically includes: being configured to receive a usage status event report from the usage monitoring network element, where the usage status event report includes the first DNN, the identification information of the first slice, and the first indication information.

In a sixth embodiment, the communication apparatus is configured to implement corresponding steps performed by the mobility management network element in the foregoing method embodiments.

The receiving unit 1010 is configured to receive availability status information of a first network from a policy control network element, where the availability status information indicates that the first network is unavailable, and the availability status information is sent when usage of a terminal device in the first network is exhausted. The sending unit 1020 is configured to send an identifier of a second network to the terminal device, where the second network is a network that the terminal device is allowed to access, and the identifier of the second network does not include identification information of the first network.

In a possible implementation method, the identification information of the first network is a first data network name DNN, and the first DNN identifies a first data network. The sending unit 1020 is configured to: before the receiving unit 1010 receives the availability status information of the first network from the policy control network element, send a subscribed DNN to the policy control network element, where the subscribed DNN includes the first DNN. Alternatively, the determining unit 1030 is configured to determine the first DNN in a subscribed DNN, and the sending unit 1020 is configured to send the first DNN and indication information to the policy control network element, where the indication information indicates to monitor a usage status of the terminal device in the first data network.

In a possible implementation method, the identification information of the first network is a first data network name DNN and identification information of a first slice, and the first DNN identifies a first data network. The sending unit 1020 is configured to: before the receiving unit 1010 receives the availability status information of the first network from the policy control network element, send, to the policy control network element, a subscribed DNN and identification information of a slice that the terminal device is allowed to access, where the subscribed DNN includes the first DNN, and the slice that the terminal device is allowed to access includes the first slice. Alternatively, the determining unit 1030 is configured to determine the first DNN in a subscribed DNN and the first slice in a slice that the terminal device is allowed to access, and the sending unit 1020 is configured to send the first DNN, the identification information of the first slice, and indication information to the policy control network element, where the indication information indicates to monitor a usage status of the terminal device in the first data network and a usage status of the terminal device in the first slice.

In a seventh embodiment, the communication apparatus is configured to implement corresponding steps performed by the first policy control network element in the foregoing method embodiments.

The receiving unit 1010 is configured to receive first indication information from a usage monitoring network element, where the first indication information indicates that usage of a terminal device in a first slice is exhausted. The sending unit 1020 is configured to: send availability status information of the first slice to a mobility management network element, where the availability status information indicates that the first slice is unavailable; or send a user route selection policy to the terminal device, where the user route selection policy does not include identification information of the first slice.

In a possible implementation method, the sending unit 1020 is further configured to send a subscription message to the usage monitoring network element, where the subscription message includes the identification information of the first slice and identification information of the terminal device, and the subscription message is for subscribing to usage status information of the terminal device in the first slice.

In an eighth embodiment, the communication apparatus is configured to implement corresponding steps performed by the first policy control network element in the foregoing method embodiments.

The receiving unit 1010 is configured to receive first indication information from a usage monitoring network element, where the first indication information indicates that usage of a first slice is exhausted. The sending unit 1020 is configured to: send availability status information of the first slice to a mobility management network element, where the availability status information indicates that the first slice is unavailable; or send a user route selection policy to a terminal device allowed to access the first slice, where the user route selection policy does not include identification information of the first slice.

In a possible implementation method, the sending unit 1020 is further configured to send a subscription message to the usage monitoring network element, where the subscription message includes the identification information of the first slice, and the subscription message is for subscribing to usage status information of the first slice.

In a ninth embodiment, the communication apparatus is configured to implement corresponding steps performed by the first policy control network element in the foregoing method embodiments.

The receiving unit 1010 is configured to receive first indication information from a usage monitoring network element, where the first indication information indicates that usage of a terminal device in a first network is exhausted. The sending unit 1020 is configured to: send availability status information of the first network to a mobility management network element, where the availability status information indicates that the first network is unavailable; or send a user route selection policy to the terminal device, where the user route selection policy does not include identification information of the first network.

In a possible implementation method, the sending unit 1020 is further configured to send a subscription message to the usage monitoring network element, where the subscription message includes the identification information of the first network and identification information of the terminal device, and the subscription message is for subscribing to usage status information of the terminal device in the first network.

In a tenth embodiment, the communication apparatus is configured to implement corresponding steps performed by the usage monitoring network element in the foregoing method embodiments.

The receiving unit 1010 is configured to obtain identification information of a terminal device and identification information of a first slice. The determining unit 1030 is configured to determine that usage of the terminal device in the first slice is exhausted. The sending unit 1020 is configured to send first indication information to a first policy control network element, where the first indication information indicates that the usage of the terminal device in the first slice is exhausted.

In an eleventh embodiment, the communication apparatus is configured to implement corresponding steps performed by the usage monitoring network element in the foregoing method embodiments.

The receiving unit 1010 is configured to obtain identification information of a first slice. The determining unit 1030 is configured to determine that usage of the first slice is exhausted. The sending unit 1020 is configured to send first indication information to a first policy control network element, where the first indication information indicates that the usage of the first slice is exhausted.

In a twelfth embodiment, the communication apparatus is configured to implement corresponding steps performed by the usage monitoring network element in the foregoing method embodiments.

The receiving unit 1010 is configured to obtain identification information of a first network and identification information of a terminal device. The determining unit 1030 is configured to determine that usage of the terminal device in the first network is exhausted. The sending unit 1020 is configured to send first indication information to a first policy control network element, where the first indication information indicates that the usage of the terminal device in the first network is exhausted.

Optionally, the communication apparatus 1000 may further include a storage unit. The storage unit is configured to store data or instructions (which may also be referred to as code or a program). The foregoing units may interact with or be coupled to the storage unit, to implement a corresponding method or function. For example, a processing unit may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application specific integrated circuits (ASIC), one or more microprocessors (DSP), one or more field programmable gate arrays (FPGA), or a combination of at least two of the integrated circuit forms. For another example, when the units in the apparatus may be implemented in a form in which a processing element invokes a program, the processing element may be a general-purpose processor, for example, a central processing unit (CPU) or another processor that can invoke the program. For another example, the units may be integrated and implemented in a form of a system-on-a-chip (SOC).

The foregoing unit (for example, the receiving unit) for receiving is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit (for example, the sending unit) for sending is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 11:
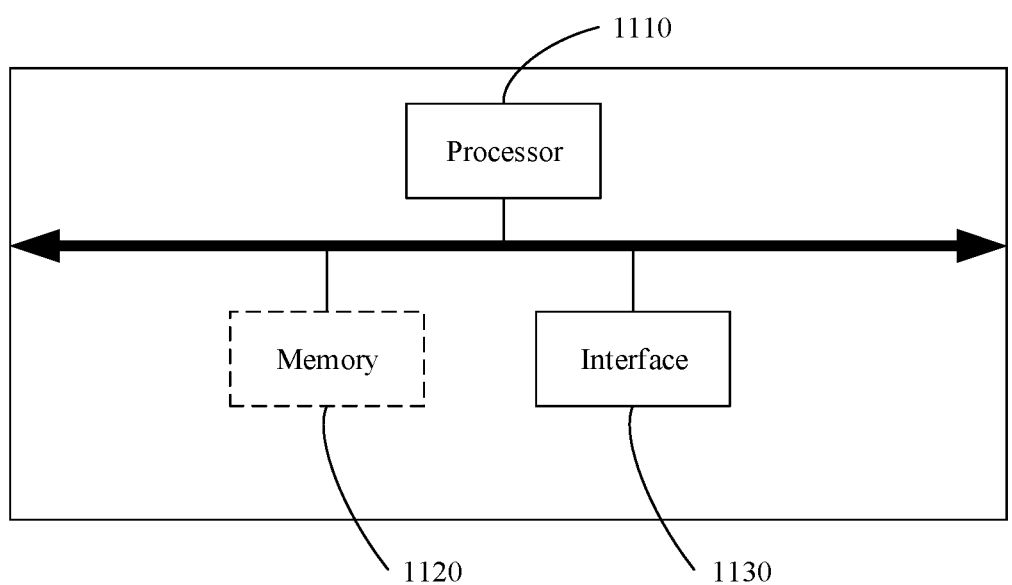
FIG. 11 is a schematic diagram of another communication apparatus according to this application.

FIG. 11 is a schematic diagram of another communication apparatus according to an embodiment of this application. The communication apparatus is configured to implement an operation of the first policy control network element, the mobility management network element, or the usage monitoring network element in the foregoing embodiments. As shown in FIG. 11, the communication apparatus includes a processor 1110 and an interface 1130. Optionally, the communication apparatus further includes a memory 1120. The interface 1130 is configured to communicate with another device.

The method performed by the first policy control network element, the mobility management network element, or the usage monitoring network element in the foregoing embodiments may be implemented by the processor 1110 by invoking a program stored in the memory (which may be the memory 1120 in the first policy control network element, the mobility management network element, or the usage monitoring network element, or may be an external memory). That is, an apparatus used in the first policy control network element, the mobility management network element, or the usage monitoring network element may include the processor 1110. The processor 1110 invokes the program in the memory, to perform the method performed by the first policy control network element, the mobility management network element, or the usage monitoring network element in the foregoing method embodiments. The processor herein may be an integrated circuit having a signal processing capability, for example, a CPU. The apparatus used in the first policy control network element, the mobility management network element, or the usage monitoring network element may be implemented by one or more integrated circuits configured to implement the foregoing methods, for example, one or more ASICs, one or more microprocessors DSPs, one or more FPGAs, or a combination of at least two of the integrated circuit forms. Alternatively, the foregoing implementations may be combined.

Specifically, the processor 1110 in the communication apparatus 1100 shown in FIG. 11 may invoke computer-executable instructions stored in the memory 1120, to implement functions/implementation processes of the receiving unit 1010, the sending unit 1020, and the determining unit 1030 in FIG. 10. Alternatively, the processor 1110 in the communication apparatus 1100 shown in FIG. 11 may invoke computer-executable instructions stored in the memory 1120, to implement a function/an implementation process of the determining unit 1030 in FIG. 10, and a function/an implementation process of the receiving unit 1010 and the sending unit 1020 in FIG. 10 may be implemented through the interface 1130 in the communication apparatus 1100 shown in FIG. 11.

All or some of the foregoing embodiments may be implemented by using software, hardware, firmware, or any combination thereof. When software is for implementing embodiments, all or a part of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits in embodiments of this application may implement or operate the functions by using a general-purpose processor, a digital signal processor, an application specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

Steps of the methods or algorithms in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into the processor. The processor and the storage medium may be disposed in the ASIC.

These computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specified function in one or more processes in the flowcharts and/or in one or more blocks in the block diagrams.

In one or more example designs, the foregoing functions in this application may be implemented by using hardware, software, firmware, or any combination thereof. If the functions are implemented by using software, the functions may be stored in a computer-readable medium or are transmitted to the computer-readable medium in a form of one or more instructions or code. The computer-readable medium includes a computer storage medium or a communication medium that enables a computer program to be transferred from one place to another. The storage medium may be an available medium that may be accessed by any general-purpose or special computer. For example, such a computer-readable medium may include but is not limited to a RAM, a ROM, an EEPROM, a CD-ROM, or another optical disc storage, a disk storage or another magnetic storage apparatus, or any other medium that may be for bearing or storing program code, where the program code is in a form of instructions or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk (disk) and the disc (disc) include a compact disc, a laser disc, an optical disc, a digital versatile disc (English: Digital Versatile Disc, DVD for short), a floppy disk, and a Blu-ray disc. The disc usually copies data by a magnetic means, and the disk optically copies data by a laser means. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that enables a computer program to be transmitted from one place to another. The storage medium may be any available medium accessible to a general-purpose or a special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application. According to the foregoing descriptions of this specification in this application, technologies in the art may use or implement the content of this application. Any modification based on the disclosed content shall be considered obvious in the art. The basic principles in this application may be applied to other variations without departing from the inventive essence and scope of this application. Therefore, the content disclosed in this application is not limited to embodiments and the designs but may also be extended to a maximum scope that is consistent with the principles and disclosed new features of this application.

Although this application is described with reference to specific features and embodiments thereof, obviously, various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. It is clear that, a person skilled in the art can make various modifications and variations to this application without departing from the scope of this application. This application is intended to cover these modifications and variations of this application provided that they fall within the scope of protection of the claims of this application and their equivalent technologies.

What is claimed is:

1. A communication method, comprising:
receiving, by a first policy control network element, first indication information from a usage monitoring network element, wherein the first indication information indicates that usage of a terminal device in a first network is exhausted;
responsive to receiving the first indication information, sending, by the first policy control network element, a user route selection policy to the terminal device, wherein the user route selection policy does not comprise identification information of the first network; and
preventing the terminal device from continuing to use a service of the first network,
wherein the first policy control network element and the usage monitoring network element are implemented in one or more hardware devices of a core network of the first network, and wherein each hardware device of the one or more hardware devices includes at least one of: a processor, a chip, or circuitry.

2. The method according to claim 1, further comprising:
sending, by the first policy control network element, a subscription message to the usage monitoring network element, wherein the subscription message comprises the identification information of the first network and identification information of the terminal device, and wherein the subscription message is for subscribing to usage status information of the terminal device in the first network.

3. The method according to claim 2, wherein the identification information of the first network is a first data network name (DNN) and the first DNN identifies a first data network, and wherein the subscription message is for subscribing to usage status information of the terminal device in the first data network, and wherein the first indication information indicates that usage of the terminal device in the first data network is exhausted.

4. The method according to claim 3, wherein before the sending, by the first policy control network element, the subscription message to the usage monitoring network element, the method further comprises:
receiving, by the first policy control network element, a subscribed DNN from a mobility management network element, wherein the subscribed DNN comprises the first DNN.

5. The method according to claim 3, wherein before the sending, by the first policy control network element, the subscription message to the usage monitoring network element, the method further comprises:
receiving, by the first policy control network element, the first DNN and second indication information from a mobility management network element, wherein the second indication information indicates to monitor a usage status of the terminal device in the first data network,
wherein the mobility management network element is implemented in one or more hardware devices of the core network of the first network, and wherein each hardware device of the one or more hardware devices includes at least one of: a processor, a chip, or circuitry.

6. The method according to claim 1, wherein the receiving, by the first policy control network element, first indication information from the usage monitoring network element comprises:
receiving, by the first policy control network element, a usage status event report from the usage monitoring network element, wherein the usage status event report comprises the first DNN and the first indication information.

7. The method according to claim 2, wherein the identification information of the first network is a first data network name (DNN) and identification information of a first slice, the first DNN identifies a first data network, the identification information of the first slice identifies the first slice, the subscription message is for subscribing to usage status information of the terminal device in the first data network and usage status information of the terminal device in the first slice, and the first indication information indicates that usage of the terminal device in the first data network and usage of the terminal device in the first slice are exhausted.

8. The method according to claim 7, wherein before the sending, by the first policy control network element, the subscription message to the usage monitoring network element, the method further comprises:
receiving, by the first policy control network element from a mobility management network element, a subscribed DNN and identification information of a slice that the terminal device is allowed to access, wherein the subscribed DNN comprises the first DNN, and the slice that the terminal device is allowed to access comprises the first slice.

9. The method according to claim 7, wherein before the sending, by the first policy control network element, the subscription message to the usage monitoring network element, the method further comprises:
receiving, by the first policy control network element, the first DNN, the identification information of the first slice and second indication information from a mobility management network element, wherein the second indication information indicates to monitor a usage status of the terminal device in the first data network and a usage status of the terminal device in the first slice,
wherein the mobility management network element is implemented in one or more hardware devices of the core network of the first network, and wherein each hardware device of the one or more hardware devices includes at least one of: a processor, a chip, or circuitry.

10. The method according to claim 1, wherein the receiving, by the first policy control network element, the first indication information from the usage monitoring network element comprises:
receiving, by the first policy control network element, a usage status event report from the usage monitoring network element, wherein the usage status event report comprises a first data network name (DNN), identification information of a first slice, and the first indication information.

11. A policy control network element, comprising:
a processor; and
a non-transitory computer-readable storage medium storing a program to be executed by the processor, the program including instructions for:
receiving first indication information from a usage monitoring network element, wherein the first indication information indicates that usage of a terminal device in a first network is exhausted;
responsive to receiving the first indication information, sending a user route selection policy to the terminal device, wherein the user route selection policy does not comprise identification information of the first network; and preventing the terminal device from continuing to use a service of the first network, wherein the policy control network element and the usage monitoring network element are implemented in one or more hardware devices of a core network of the first network, and wherein each hardware device of the one or more hardware devices includes at least one of: a processor, a chip, or circuitry.

12. The policy control network element according to claim 11, wherein the instructions further include instructions for:

sending a subscription message to the usage monitoring network element, wherein the subscription message comprises the identification information of the first network and identification information of the terminal device, and wherein the subscription message is for subscribing to usage status information of the terminal device in the first network.

13. The policy control network element according to claim 12, wherein the identification information of the first network is a first data network name (DNN), the first DNN identifies a first data network, the wherein subscription message is for subscribing to usage status information of the terminal device in the first data network, and wherein the first indication information indicates that usage of the terminal device in the first data network is exhausted.

14. The policy control network element according to claim 13, wherein the instructions further include instructions for:

receiving a subscribed DNN from a mobility management network element, wherein the subscribed DNN comprises the first DNN, wherein the mobility management network element is implemented in one or more hardware devices of the core network of the first network, and wherein each hardware device of the one or more hardware devices includes at least one of: a processor, a chip, or circuitry.

15. The policy control network element according to claim 13, wherein the instructions further include instructions for:

receiving the first DNN and second indication information from a mobility management network element, wherein the second indication information indicates to monitor a usage status of the terminal device in the first data network, wherein the mobility management network element is implemented in one or more hardware devices of the core network of the first network, and wherein each hardware device of the one or more hardware devices includes at least one of: a processor, a chip, or circuitry.

16. The policy control network element according to claim 11, wherein the receiving first indication information from the usage monitoring network element comprises:

receiving a usage status event report from the usage monitoring network element, wherein the usage status event report comprises a first data network name (DNN) and the first indication information.

17. The policy control network element according to claim 12, wherein the identification information of the first network is a first data network name (DNN) and identification information of a first slice, the first DNN identifies a first data network, the identification information of the first slice identifies the first slice, the subscription message is for subscribing to usage status information of the terminal device in the first data network and usage status information of the terminal device in the first slice, and the first indication information indicates that usage of the terminal device in the first data network and usage of the terminal device in the first slice are exhausted.

18. A communication system, comprising:
a usage monitoring network element; and
a first policy control network element,
wherein the usage monitoring network element is configured to:
send first indication information to the first policy control network element, wherein the first indication information indicates that usage of a terminal device in a first network is exhausted; and
wherein the first policy control network element is configured to:
receive the first indication information from the usage monitoring network element;
responsive to receiving the first indication information, send a user route selection policy to the terminal device, wherein the user route selection policy does not comprise identification information of the first network; and
prevent the terminal device from continuing to use a service of the first network,
wherein the first policy control network element and the usage monitoring network element are implemented in one or more hardware devices of a core network of the first network, and wherein each hardware device of the one or more hardware devices includes at least one of: a processor, a chip, or circuitry.

19. The system according to claim 18,
wherein the first policy control network element is further configured to:
send a subscription message to the usage monitoring network element, wherein the subscription message comprises the identification information of the first network and identification information of the terminal device, and wherein the subscription message is for subscribing to usage status information of the terminal device in the first network; and
wherein the usage monitoring network element is further configured to:
receive the subscription message.

20. The system according to claim 19, wherein the identification information of the first network is a first data network name (DNN), the first DNN identifies a first data network, the subscription message is for subscribing to usage status information of the terminal device in the first data network, and the first indication information indicates that usage of the terminal device in the first data network is exhausted.

21. The system according to claim 19, wherein the identification information of the first network is a first data network name (DNN) and identification information of a first slice, wherein the first DNN identifies a first data network, the identification information of the first slice identifies the first slice, the subscription message is for subscribing to usage status information of the terminal device in the first data network and usage status information of the terminal device in the first slice, and the first indication information indicates that usage of the terminal device in the first data network and usage of the terminal device in the first slice are exhausted.

* * * * *

UNITED STATES PATENT AND TRADEMARK OFFICE
CERTIFICATE OF CORRECTION

PATENT NO. : 12,021,695 B2
APPLICATION NO. : 17/902623
DATED : June 25, 2024
INVENTOR(S) : Ding et al.

Page 1 of 1

It is certified that error appears in the above-identified patent and that said Letters Patent is hereby corrected as shown below:

On the Title Page

Page 2: item (56) References Cited, Other Publications, Right-Hand Column, NPL Citation #2: reads as "3 Generation Partnership Project;" should read as -- 3rd Generation Partnership Project; --.

Signed and Sealed this
Fifteenth Day of April, 2025

Coke Morgan Stewart
*Acting Director of the United States Patent and Trademark Office*